May 22, 1951 W. A. CREWS 2,554,296
RECORDING DISPENSER AND SYSTEM FOR USING SAME
Filed March 27, 1947 9 Sheets-Sheet 1

INVENTOR.
William A. Crews
BY Albert G. McCaleb
Atty.

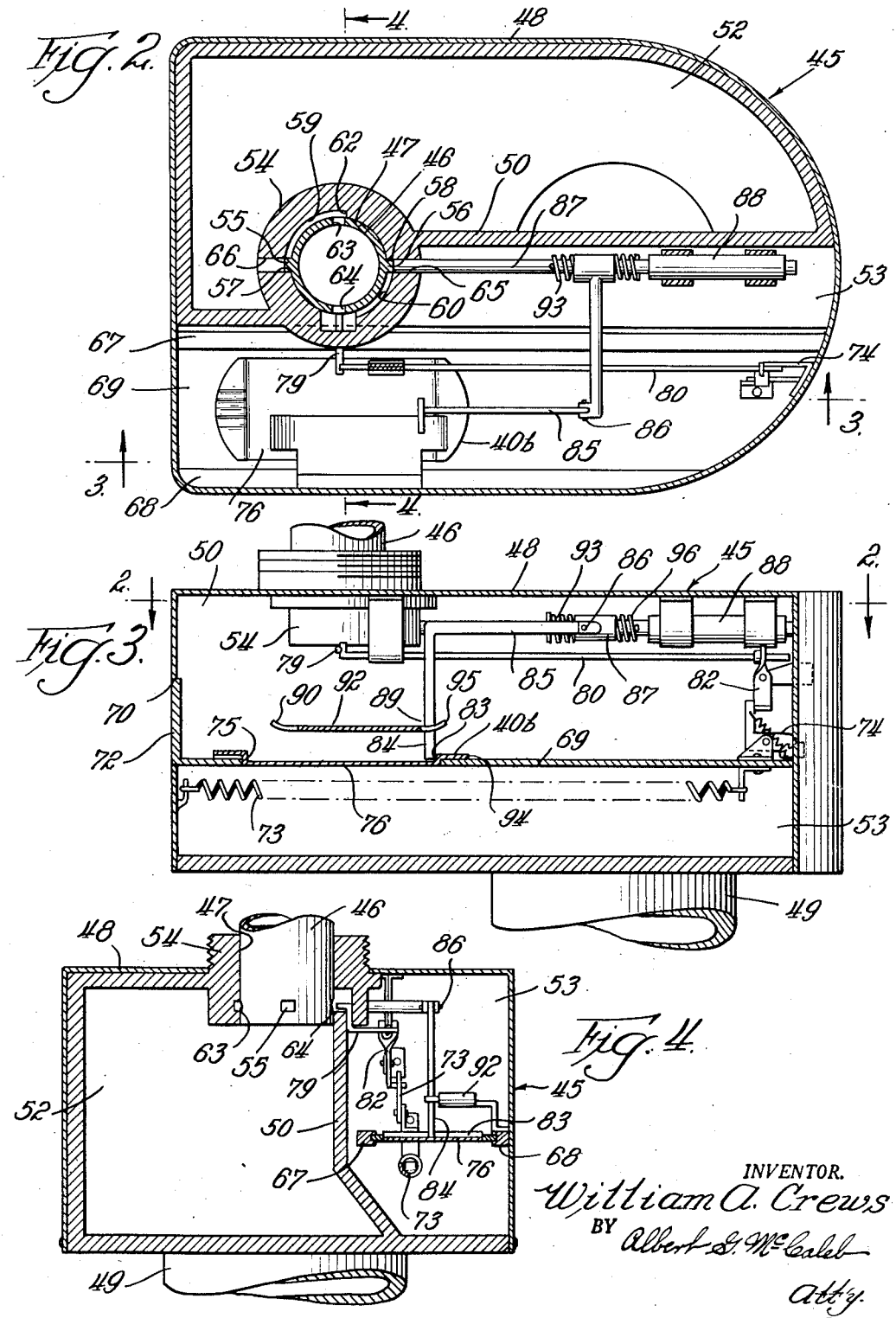

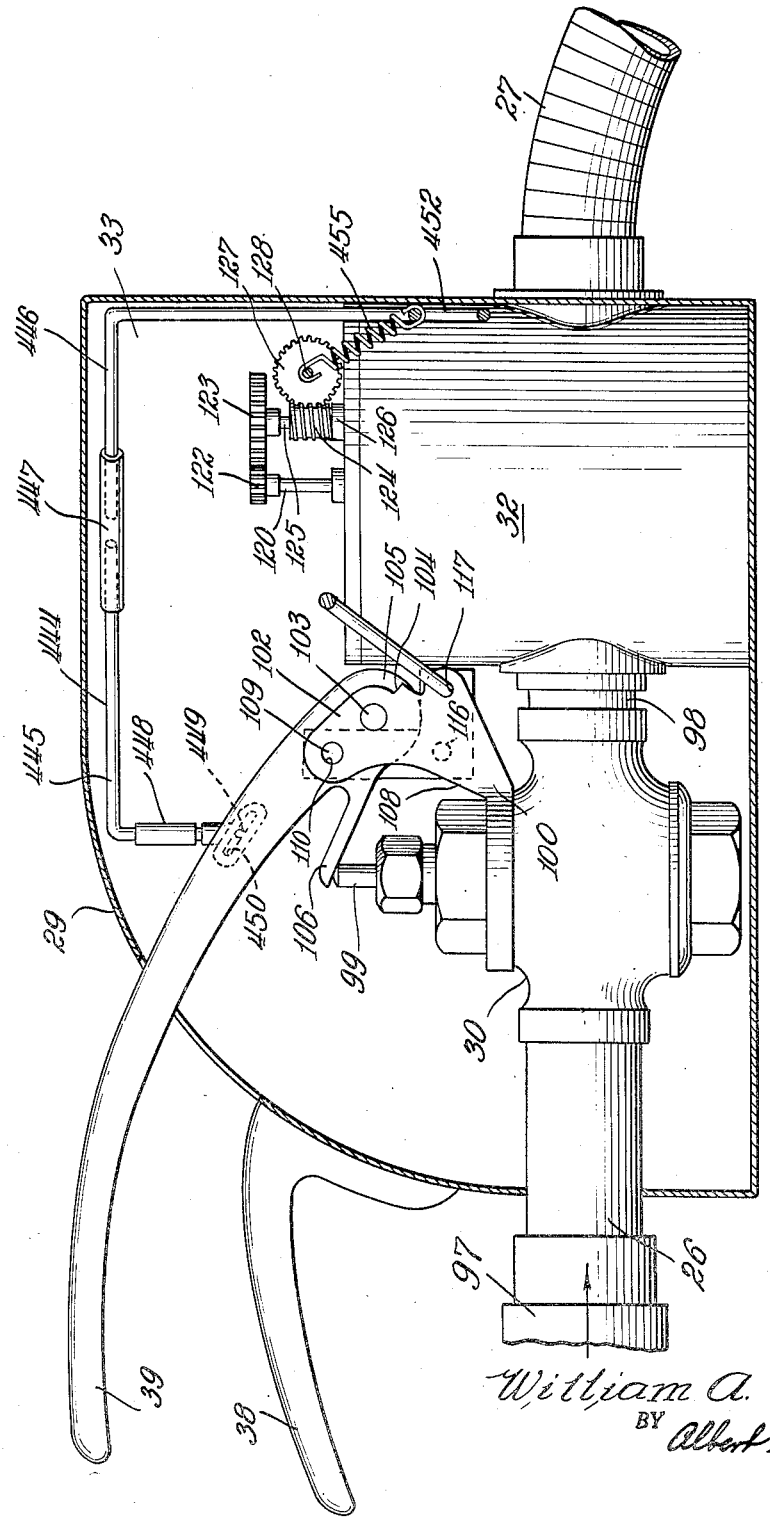

May 22, 1951 W. A. CREWS 2,554,296
RECORDING DISPENSER AND SYSTEM FOR USING SAME
Filed March 27, 1947 9 Sheets-Sheet 4
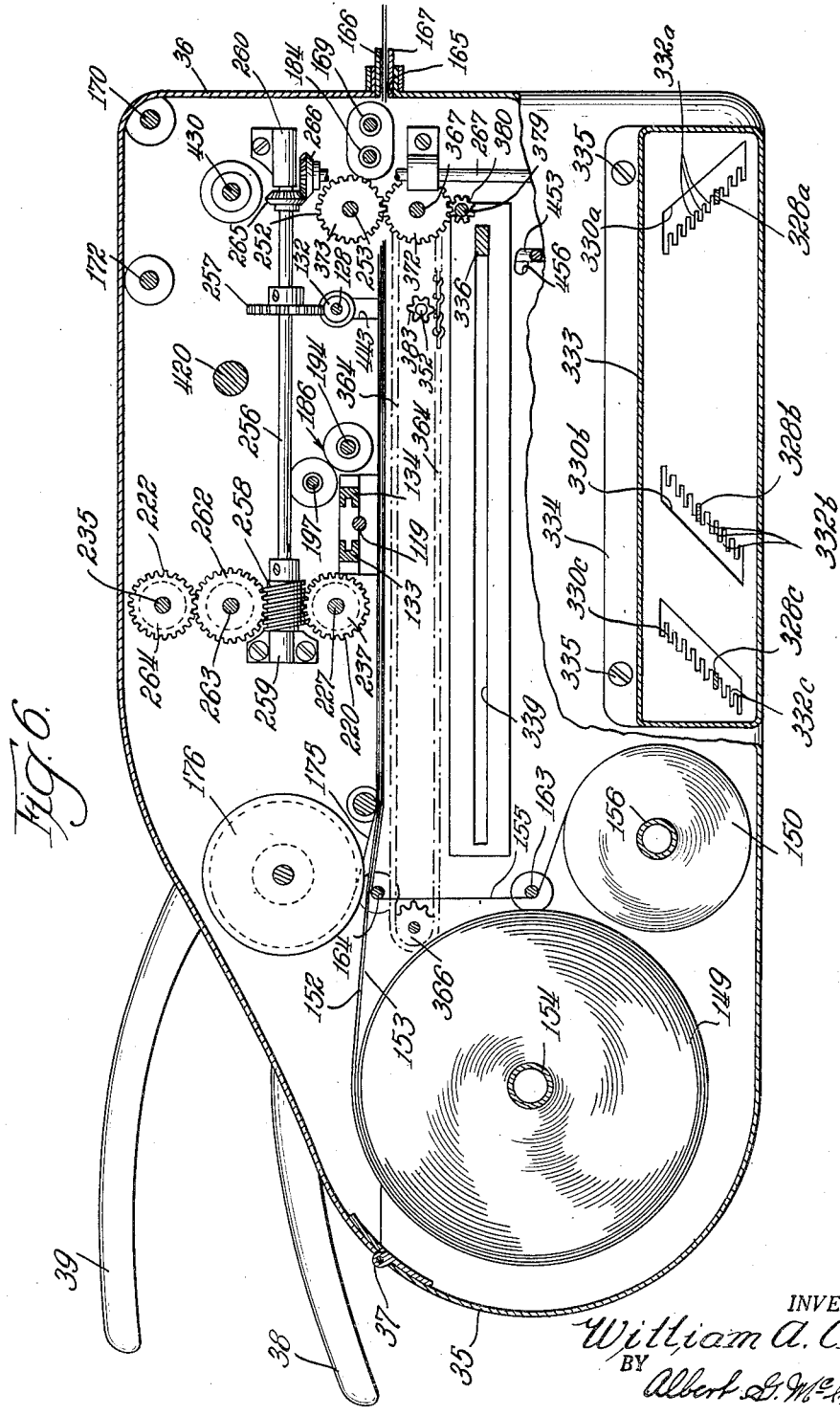
INVENTOR.
William A. Crews
BY Albert D. McCaleb
Att'y.

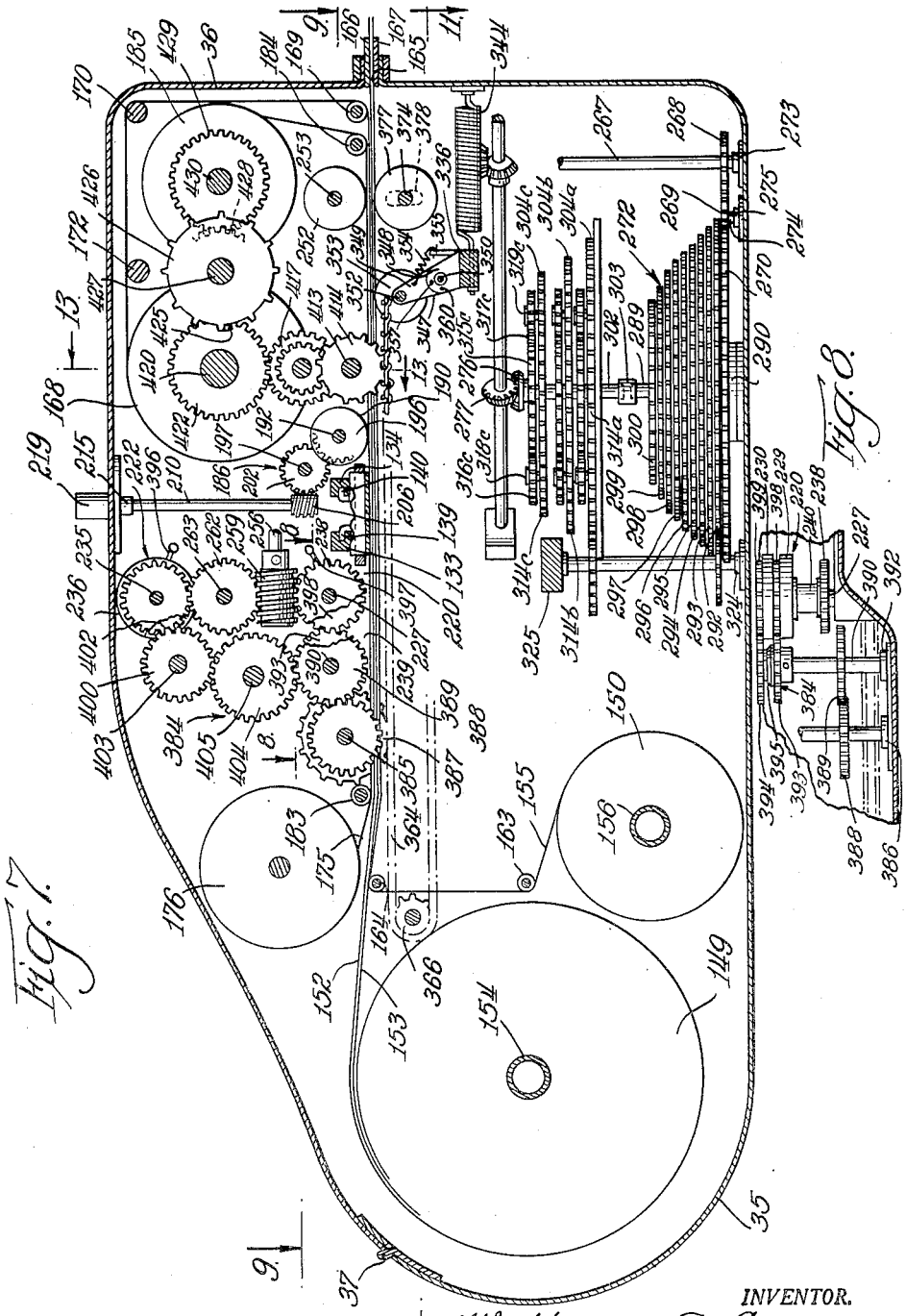

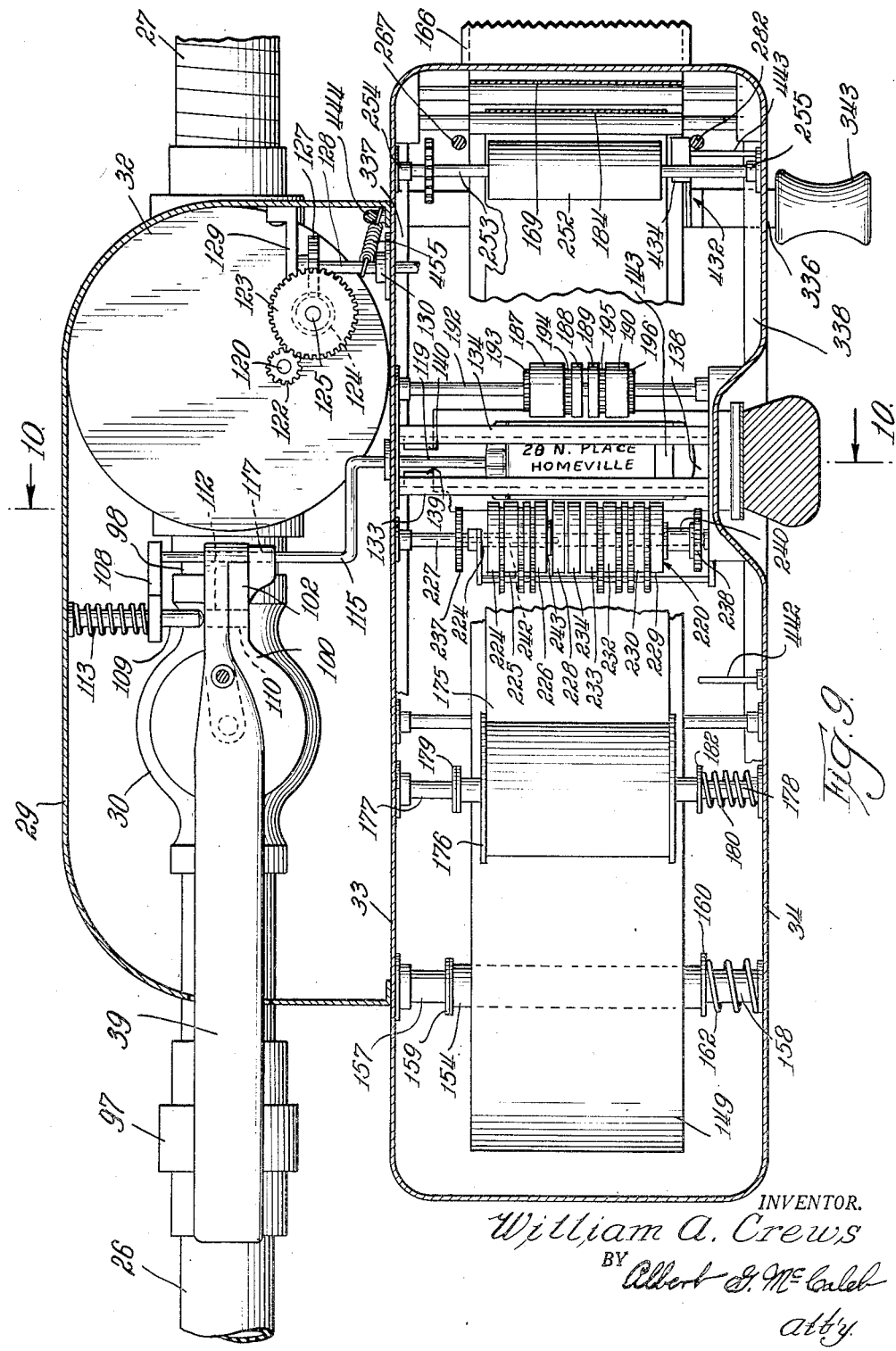

May 22, 1951   W. A. CREWS   2,554,296
RECORDING DISPENSER AND SYSTEM FOR USING SAME
Filed March 27, 1947   9 Sheets-Sheet 7
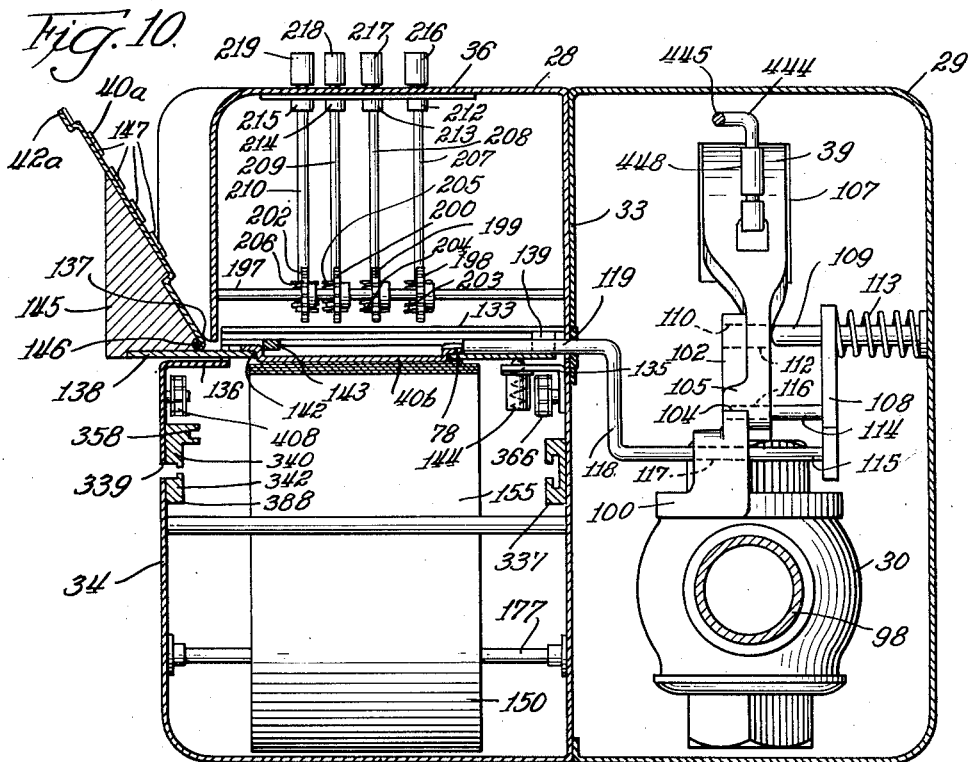
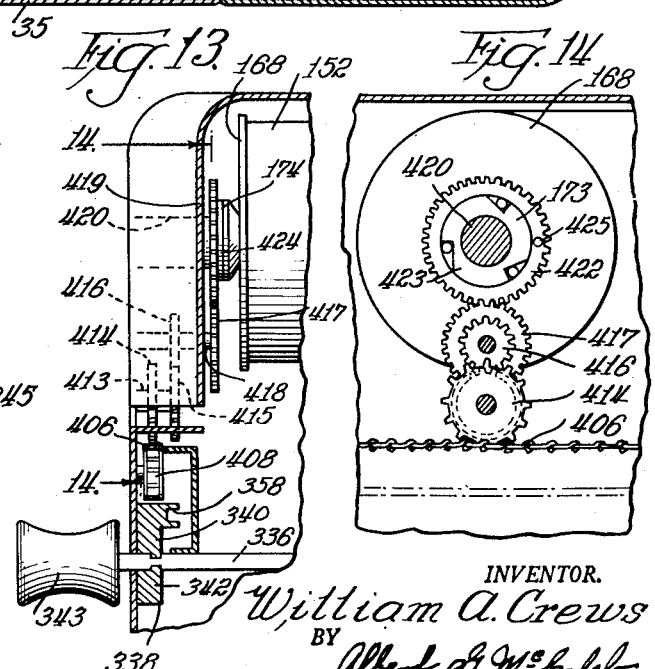
INVENTOR.
William A. Crews
BY
Albert J. McCaleb
Att'y.

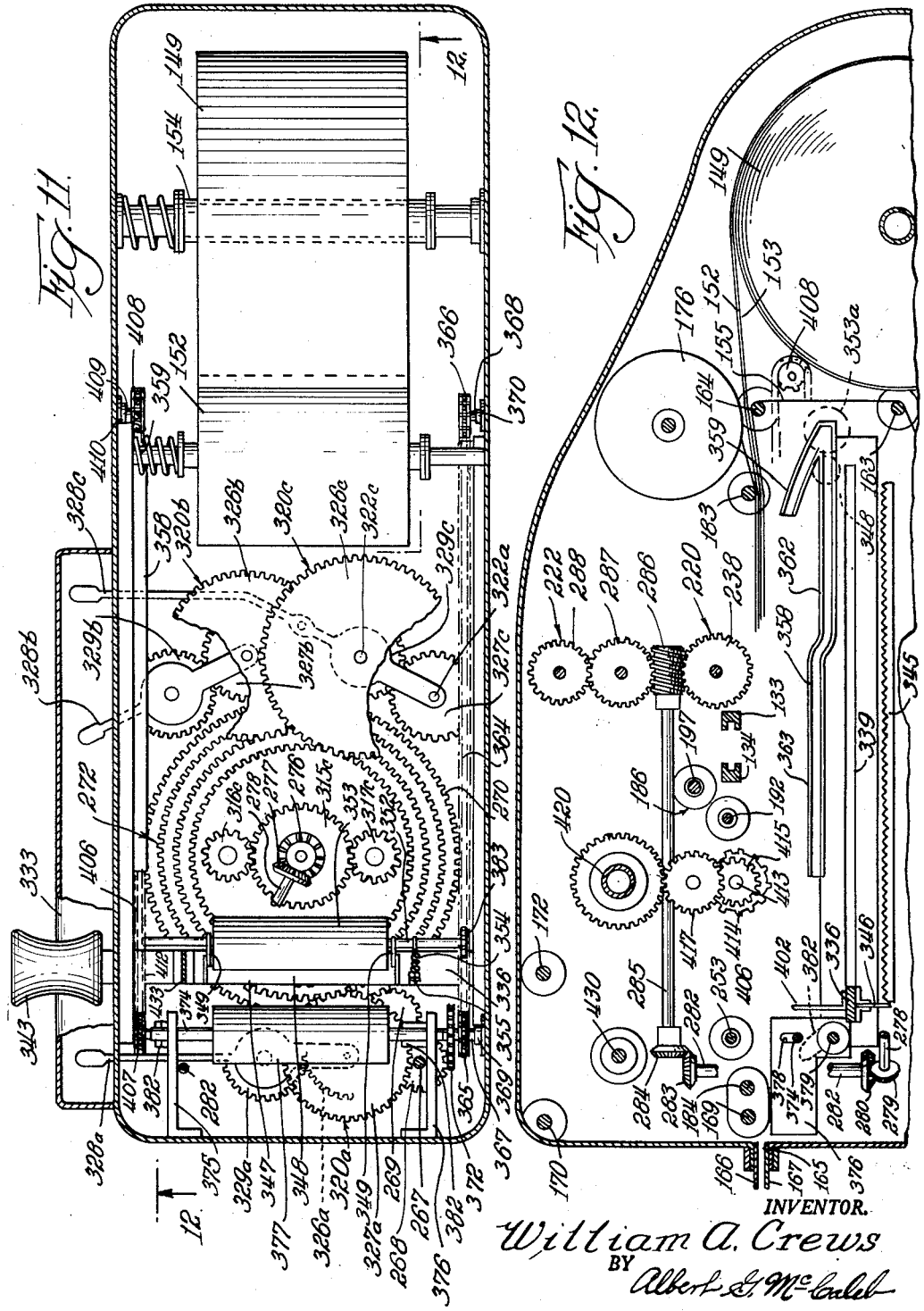

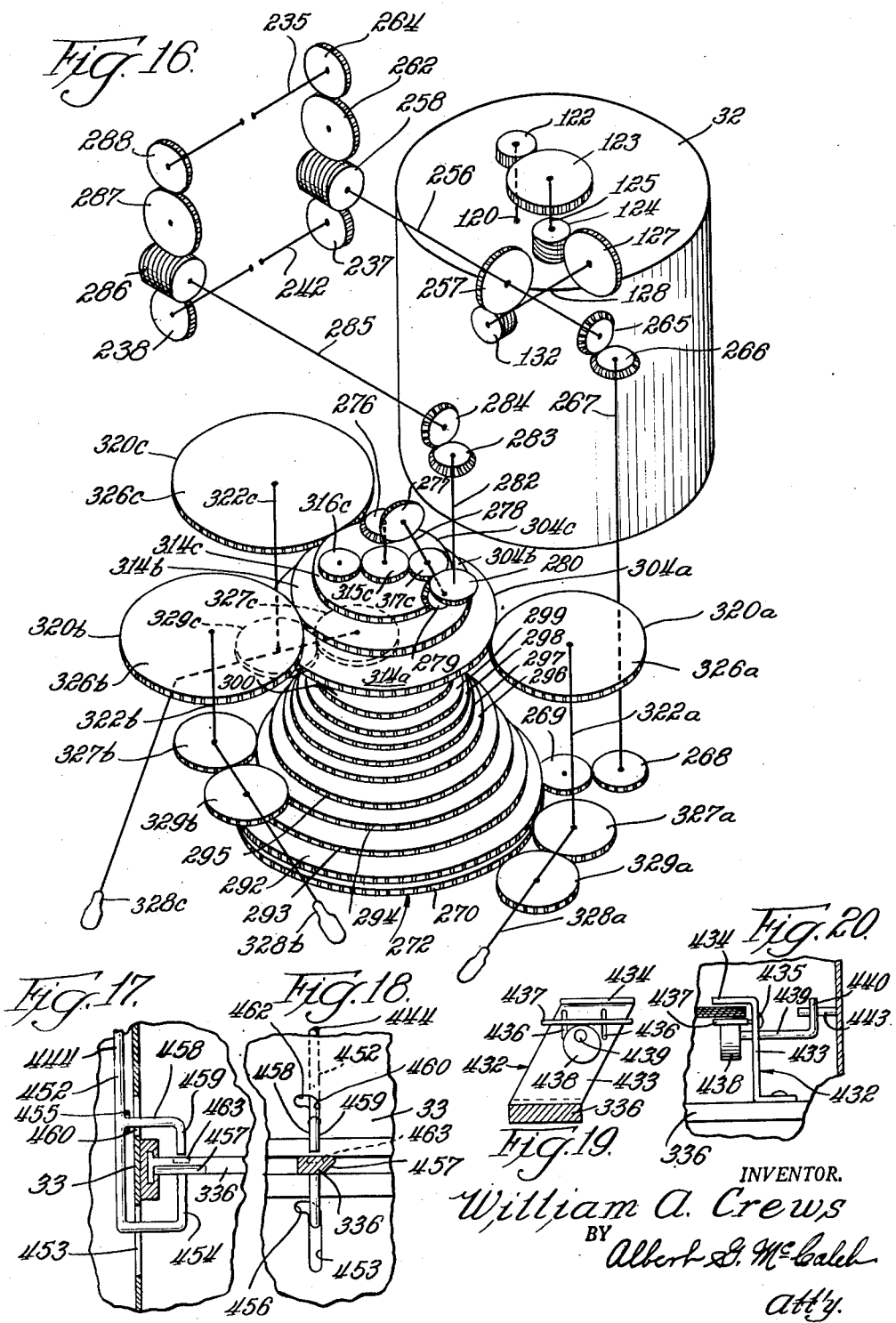

Patented May 22, 1951

2,554,296

UNITED STATES PATENT OFFICE 2,554,296

RECORDING DISPENSER AND SYSTEM FOR USING SAME

William A. Crews, River Forest, Ill.

Application March 27, 1947, Serial No. 737,459

13 Claims. (Cl. 222—30)

My invention relates to recording dispensers and to systems for the use of such dispensers to effect the accomplishment of purposes such as the keeping of accurate and true records, insurance of the delivery of full measure, the provision of receipts for "cash" and "charge" sales, the prevention of unrecorded thefts and the like, as well as providing the desired visual indications of such items as the quantity dispensed and the cost thereof.

A portion of the apparatus disclosed generally herein and which serves as an element of one adaptation of my presently disclosed system and apparatus is shown more fully in and forms the subject matter of my copending application, Serial No. 726,873, filed February 6, 1947, now United States Patent No. 2,475,562 dated July 5, 1949, and entitled Closure Apparatus for Tanks and the Like.

For the purpose of this disclosure I have shown, by way of example, an adaptation of my system and apparatus to the dispensing of a liquid, such as gasoline or oil. In such an adaptation, the apparatus embodies a metering device capable of measuring the volume of liquid passing therethrough. Since various metering, measuring, counting and weighing devices have been developed for use in quantitatively indicating or measuring different kinds and types of products, it may be readily understood that many of the features of my system and apparatus are adaptable to the dispensing of various commodities by the selection of an appropriate measuring or metering device.

One of the objects of this invention is to provide a system for dispensing a commodity, which system embodies dispensing apparatus having a keyed outlet member attachable to cooperatively keyed receiving apparatus, upon which attachment a control instrumentality is released for use in the dispensing apparatus to effect release of the latter for dispensing purposes.

As another object my invention has within its purview the provision of dispensing and receiving apparatus adapted to be locked together for the passage of a commodity from one to the other and wherein a control element necessary to the operation of the dispensing apparatus is freed for use only while the dispensing apparatus is locked to the receiving apparatus.

My invention further comprehends the provision of a system utilizing a recording dispenser so constructed and arranged that all of the dispensed commodity which passes through the dispenser is accounted for by "cash" or "charge" sales tickets and wherein the "charge" sales tickets are individualized to indicate the customer for the sale.

For another object the invention includes the provision of recording dispensing apparatus necessitating a keyed element to effect release of the apparatus for dispensing purposes.

Another object of this invention is to provide a recording dispenser embodying a metering device for measuring the commodity dispensed, printing elements for producing a record of each dispensing operation and wherein a keyed element is necessary to each dispensing operation, which keyed element also serves as a printing element to distinguish sales and types of sales.

As another object my invention comprehends the provision of a recording dispenser adapted, upon manual operation, to eject a printed receipt and wherein certain fixed and variable parts of the printed data are impressed upon the receipt at different times.

As a corollary to the preceding object, it is a further object of my invention to provide a printing mechanism in which a part of the printed data is impressed upon the receipt while it is being ejected and wherein the construction and arrangement of parts are such that the latter printing impressions are intermittent, so that the paper is periodically relieved during the ejecting movement thereof.

My invention further has for an object the provision of a recording dispenser including a mechanism for printing receipts for each dispensing transaction and wherein an audit copy of the receipt is retained in a normally inaccessible place within the dispensing apparatus.

It is another object of my invention to provide a recording dispenser embodying an effective interlock between the dispensing and recording controls, whereby the recording and dispensing operations are segregated so that recording cannot be effected during a dispensing operation and no dispensing can be done during the recording.

Another object of the invention is to provide in dispensing apparatus a price computing mechanism adapted to be reset to suit changes of unit prices by the movement of readily adjustable parts to predetermined positions.

Other objects and advantages of the invention will be apparent from the following description and the accompanying drawings in which similar characters of reference indicate similar parts throughout the several views.

In the nine sheets of drawings:

Fig. 1 is a perspective view taken from the rear and to one side of a preferred embodiment of my recording dispenser shown in association with other apparatus to indicate a preferred system of use for such apparatus;

Figs. 2, 3 and 4 are sectional views of a portion of the apparatus shown in Fig. 1 wherein the sections are taken substantially on lines 2—2 of Fig. 3, 3—3 of Fig. 2, and 4—4 of Fig. 2, respectively, and viewed in the direction indicated by the respective arrows;

Fig. 5 is a side sectional view of a portion of the recording dispenser shown in Fig. 1, wherein the position of the section is indicated substantially by a line 5—5 of Fig. 1 and the accompanying arrows;

Fig. 6 is a sectional view of another portion of the recording dispenser wherein the position of the section is indicated by a line 6—6 of Fig. 1 and the accompanying arrows;

Fig. 7 is another sectional view of the recording dispenser wherein the position of the section is indicated by a line 7—7 of Fig. 1 and the accompanying arrows;

Fig. 8 is a fragmentary view of a portion of the structure shown in Fig. 7, wherein that structure is viewed substantially as indicated by a line 8—8 of Fig. 7 and the accompanying arrows;

Fig. 9 is a sectional view of the recording dispenser wherein the section is taken substantially on a line 9—9 of Fig. 7 and viewed in the direction indicated by the accompanying arrows;

Fig. 10 is a sectional view taken substantially on a line 10—10 of Fig. 9 and viewed in the direction indicated by the accompanying arrows;

Fig. 11 is a sectional view taken substantially on a line 11—11 of Fig. 7 and viewed as indicated by the accompanying arrows;

Fig. 12 is a fragmentary sectional view wherein the section is taken substantially on a line 12—12 of Fig. 11 and viewed as indicated by the accompanying arrows;

Fig. 13 is a fragmentary sectional view in which the section is taken substantially on a line 13—13 of Fig. 7;

Fig. 14 is a fragmentary sectional view wherein the section is taken substantially on a line 14—14 of Fig. 13;

Fig. 15 is a plane view of an exemplary form of receipt adapted to be provided with my preferred dispensing apparatus;

Fig. 16 is a diagrammatic perspective view which depicts certain of the driving connections of the recording apparatus utilized in the preferred embodiment of my recording dispenser.

Figs. 17 and 18 are fragmentary sectional and end side views, respectively, depicting details of parts in the assembly of my recording dispenser; and Figs. 19 and 20 are fragmentary side and end sectional views, respectively, which depict the details of another part of my preferred recording dispenser structure.

Figure 1:
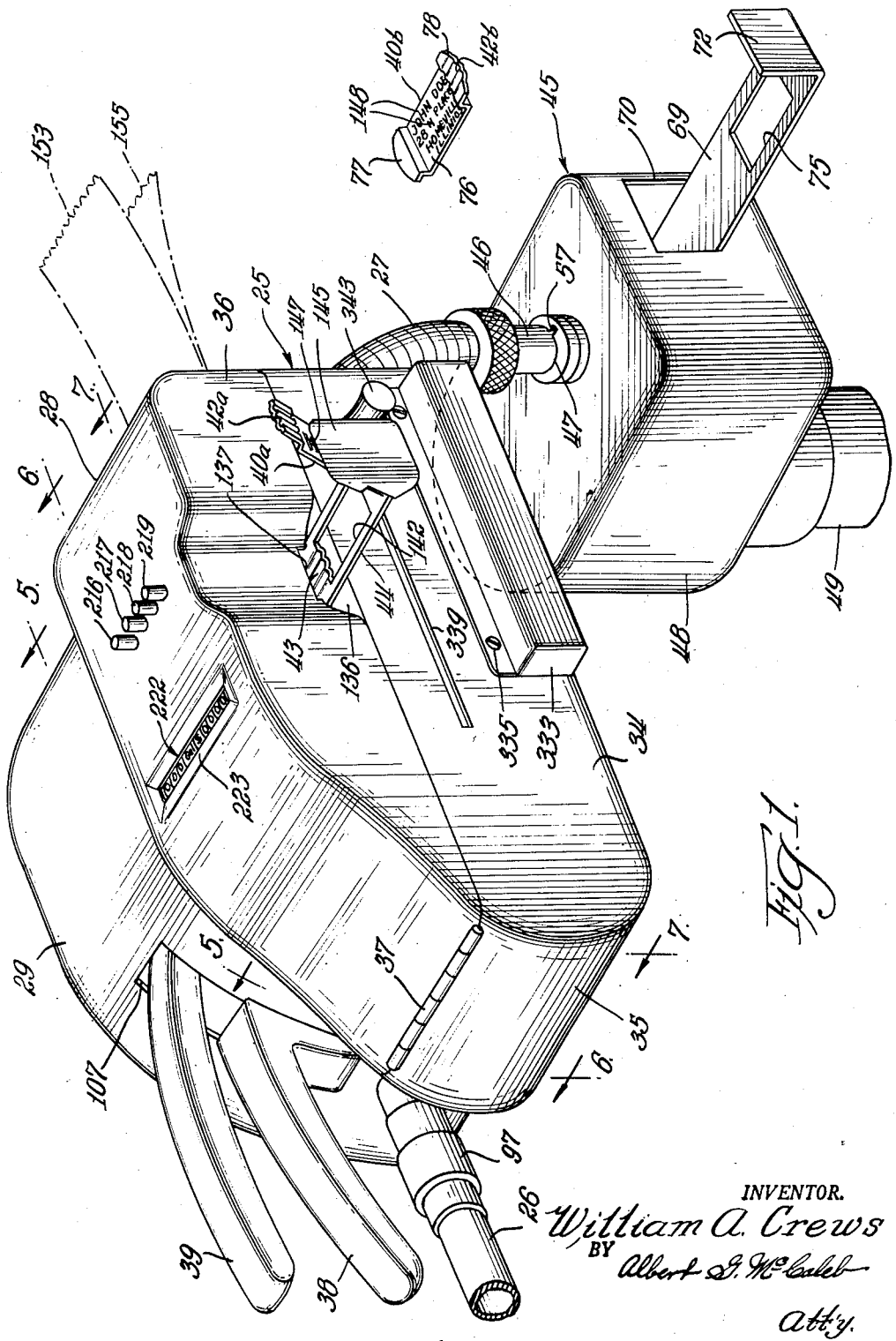

Referring generally to the exemplary embodiment of my dispensing system and apparatus which is disclosed for illustrative purposes in the accompanying drawings, a recording dispenser 25, in the present instance, is portable, although it may be included in a stationary unit having flexible connecting elements leading thereto and therefrom. A commodity to be dispensed is fed to the dispenser through a supply conduit 26 and emitted therefrom through an outlet conduit 27. The supply and outlet conduits, as well as other parts of the apparatus, are, in any instance, suited to the product or commodity to be handled thereby.

For dispensing gasoline or oil, to which the disclosed apparatus is adapted, the recording dispenser 25 is embodied within a housing 28 having a portion 29 within which a flow control valve 30 and a metering device 32 (Figs. 5 and 9) are enclosed and connected in series with the supply and outlet conduits 26 and 27, respectively. At one side of the housing portion 29 and desirably divided therefrom by a partitioning wall 33, is a second housing portion 34 including a base section 35 and a cover 36 connected thereto by a hinge 37 and desirably provided with a lock for keeping the cover closed. In the disclosed apparatus, and as will be more fully described, computing, recording and receipt printing mechanisms are enclosed within the housing portion 34.

In my preferred system of operation and use, the flow control valve 30 is actuated manually by gripping stationary and movable handles 38 and 39, respectively. However, the valve operating parts, in the present instance, are normally locked to prevent the valve from being opened without the use of a key, such as 40a or 40b. In the disclosed embodiment I have utilized keys 40a and 40b in the form of token plates having notched end margins 42a and 42b, respectively, adapted to fit into a cooperatively notched portion 43 of a key slide 44 to perform the keying function and which keys having printed indicia on one face thereof serve as a part of the recording apparatus.

To take full advantage of the normally locked recording dispenser and the keying as well as the printing functions of the keys 40a and 40b for handling different types of accounts, such as cash and charge transactions, a release key 40a for cash sales is hingedly attached to the key slide 44; while keys, such as 40b, may have individualized indicia thereon and be retained by a customer having a charge account or retained in a closure apparatus for tanks and the like, such as 45, shown in Figs. 1 to 4, inclusive. With the disclosed closure apparatus for tanks and the like, which apparatus forms the subject matter of my copending application, Serial No. 726,873, filed February 6, 1947, now United States Patent No. 2,475,562, dated July 5, 1949, the key 40b is normally retained by the closure apparatus and released by the insertion of a keyed end portion or nozzle 46 on the outlet conduit 27 into a cooperatively keyed aperture 47 of the closure apparatus. The release of the key 40b by the closure apparatus effects the locking of the keyed nozzle 46 into the keyed aperture, so that it cannot be removed until the key is returned to its normal position in the closure apparatus.

It may thus be understood, at least in a general way, at the present stage of the disclosure, that by incorporating calibrated and automatically operated recording and receipt printing mechanisms within my dispenser which are inaccessible to unauthorized parties, and by providing a printed receipt from the dispenser for the customer, as well as retaining a record or audit receipt within the dispenser, both the customer and the user of my system and apparatus are assured of the type of transaction, the quantity delivered during a transaction and the delivery of the recorded amount during the transaction. The user also has a reliable record of delivered amounts and whether those amounts are to be accounted for by cash receipts or by charges against established accounts.

Since the closure apparatus 45 is disclosed and described in detail in my aforementioned copending application, it will only be described herein to the extent necessary for an understanding of its structure and operation as utilized in one embodiment of my dispensing system, as a whole. The external appearance of the closure apparatus 45 is depicted in Fig. 1, while the details of the internal operating mechanism are shown in Figs. 2, 3 and 4. Referring to those figures, a housing 48 is mounted on the end of a conduit 49 and has an internal partitioning wall 50 dividing the interior into a fluid flow compartment 52 and a key retaining compartment 53. The keyed inlet aperture 47 extends through a ring-like portion 54 which is integrally formed in the partitioning wall 50 and communicates with the top of the fluid flow compartment while the outlet conduit 49 is in communication with the lower part of the compartment.

In my exemplary embodiment, the end portion or nozzle 46 is keyed by the provision of integral lugs 55 and 56 on the outer surface thereof, which lugs are adapted to fit into properly spaced axial slots 57 and 58, respectively, in the interior wall surface of the aperture 47. At their lower ends the axial slots 57 and 58 adjoin circumferential slots 59 and 60, respectively, so that the nozzle may be turned after being inserted in the aperture to an extent such that the lugs reach the bottoms of the axial slots. An end surface 62 of the circumferential slot 59 serves as a stop to limit the rotational movement of the nozzle within the aperture. At such limit of circumferential movement, apertures 63 and 64 in opposite sides of the nozzle are aligned with diametrically opposed bores 65 and 66, respectively, in the ring-like portion 54 on opposite sides of the aperture.

Within the key retaining compartment 53, oppositely disposed channel-type tracks 67 and 68 are secured to the interior of the housing 48 and support a key slide 69 for linear movement between a retracted position, as shown in Fig. 3, and an extended position, as shown in Fig. 1. The key slide moves into and from the compartment through an opening 70 and includes a front portion 72 for closing the opening 70 when the slide is in the retracted position. The key slide is normally biased toward the extended position shown in Fig. 1 by a tension spring 73 having one end anchored to the interior of the housing and its other end secured to the slide. A spring-urged latch mechanism 74 normally retains the key slide in its retracted position, as shown in Fig. 3, against the biasing force of the spring 73.

Intermediate its ends and in a position such that it will be exposed when the slide is in the extended position shown in Fig. 1, the slide has therein a key retaining opening 75 adapted to receive and substantially fit a mid-portion 76 of the key 40b. At opposite ends, the key is provided with integral end portions 77 and 78 offset from and substantially parallel to the mid-portion 76. In the present instance, it is the end portion 78 which is notched to individualize the key.

When the keyed nozzle 46 is turned to its seated position in the aperture 47, the lug 56 on the outer surface thereof engages the end of a small crank 79 which is rotatably supported in the ring-like portion 54, as shown in Fig. 4. The resultant movement of the outer end of the crank 79 moves a push rod 80 to actuate a lever 82 which, in turn, effects disengagement of the latch mechanism 74 to release the slide for outward movement produced by the force of the spring 73. Normally, when the slide 69 is in the retracted position shown in Fig. 3, a shoulder 83 of the key 40b engages a depending end 84 of a plunger actuating arm 85, which arm is movably connected by a pin 86 to a linearly movable locking plunger 87. One end of the locking plunger 87 is supported for linear movement in the bore 65, while the other end is supported in a sleeve bearing 88.

With the nozzle 46 in its inserted position so that the apertures 63 and 64 in opposite sides thereof are aligned with the bores 65 and 66, the locking plunger 87 is moved with and by the slide 69, upon its release, to a position such that the plunger extends through the nozzle to lock it in position and prevent it from being removed from the keyed aperture 47.

The outward movement of the slide 69 is sufficient that the locking plunger 87 is seated in a position extending through the nozzle 46 before the limit of outward movement of the slide is reached. As the locking plunger 87 approaches its seated position, a cross arm 89 on the depending end 84 of the plunger actuating arm engages a curved end portion 90 of a cam 92 to move the plunger actuating arm upwardly to an extent that it is released from the shoulder 83 of the key. At the same time, a compression spring 93 on the locking plunger 87 engages the outer surface of the ring-like portion 54 to move the plunger backwardly a small amount so that the cross arm 89 is retracted along the curved portion 90 of the cam to a position such that the depending end of the actuating arm is aligned for engagement with the end surface 94 of the key if that key is in place in the slide. On the other hand, if the key is not in place on the slide, the locking plunger will not be retracted and the latch mechanism 74 will not be released to hold the slide in its retracted position.

When the key 40b is in its proper position on the slide, engagement of the end surface 94 of the key with the depending end 84 of the plunger actuating arm during inward movement of the slide retracts the locking plunger to a position such as that shown in Fig. 2 in which it is withdrawn from the nozzle. After the locking plunger has been withdrawn from the nozzle and prior to the limit of inward movement of the slide 69, a curved end portion 95 of the cam 92 effects disengagement of the end of the actuating member from the end surface 94 of the key. Upon such release of the actuating arm from the end of the key, a compression spring 96 on the locking plunger 85 engages the end of the sleeve bearing 88 to move the plunger and its actuating arm to a position off of the curved portion 95 of the cam and into engagement with the shoulder 83 of the key for another similar sequence of operation.

From the description thus far, it may be readily understood that release of the key 40b from the key retaining compartment 53 of the closure apparatus 45 is effected by insertion of a properly keyed nozzle 46 into the keyed aperture 47 and the turning of that nozzle in the aperture to a fully seated position. When the key is thus released and until it is replaced in its proper position on the slide 69, the nozzle is locked into the keyed aperture. Upon returning the key to the slide and moving the slide to its retracted position, the nozzle 46 is unlocked so that it may be removed from the closure apparatus. Such an arrangement of parts is particularly desirable for use to insure, without supervision, the delivery of a specified amount to a customer having a charge account, particularly when the key is utilized to effect release of the dispensing apparatus and carries indicia thereon which is utilized as a part of the recording apparatus for entering the record of the particular transaction.

My preferred dispensing system utilizes with the described closure apparatus the recording dispenser 25 which has thus far been only generally described. In this dispenser, and as illustrated in Figs. 5, 9 and 10, the supply conduit 26 connects to the flow control valve 30 through suitable means such as a detachable coupling 97. On the other side of the valve, communication is provided to the inlet side of the metering device 32 by a connecting pipe 98. Then the outlet port of the metering device communicates with the outlet conduit 27. The flow control valve 30 is of conventional construction and has a linearly movable control plunger 99 biased by a spring within the valve housing to an extended position in which the valve is closed; opening of the valve and the degree of that opening being controlled by the inward movement of the plunger against the biasing force of the internal spring.

A bracket 100 is secured to the valve housing and has an angularly disposed projecting portion 102 extending outwardly at one side of the valve control plunger. To that projecting portion 102 one end of the movable valve operating handle 39 is secured for rotational swinging movement by fastening means, such as a pin 103. A shoulder 104 on the projecting portion 102 of the bracket engages a projecting portion 105 on one side of the movable handle 39 to serve as a stop, limiting the outward movement of the handle away from the valve. On its inner surface, and projecting to a position of engagement with the end of the control plunger 99, is an integral finger 106 adapted to force the control plunger inwardly for opening the valve upon movement of the projecting end of the movable handle 39 toward the stationary handle 38. To provide convenient access to the handles 38 and 39 for effecting control of the valve by gripping the handles and squeezing them together, they extend outwardly in adjacent and normally separated relationship from the portion 29 of the housing; the stationary handle 38 being secured to the housing and the movable handle 39 extending through a slot 107 in the housing.

In order to lock the movable handle 39, so as to prevent the opening of the valve except when the lock is released, I have provided an angle plate 108 which carries a locking pin 109 adapted to extend through normally aligned bores 110 and 112 in the projecting portion 102 of the bracket and the movable handle 39, respectively, at a distance from the pin 103 about which the handle normally moves. The bores 110 and 112 are aligned for receiving the locking pin 109 when the handle 39 is in a position such that the valve is closed. A compression spring 113 disposed between the angle plate 108 and the wall of the housing portion 29 biases the angle plate 108 and the locking pin 109 toward the valve locking position. In Figs. 9 and 10 the locking pin 109 is shown retracted from the bores 110 and 112.

The angle plate 108 is carried for linear movement between positions in which the locking pin is fully inserted into the bores 110 and 112 or is retracted from those bores by a guide pin 114 and a lock actuating rod 115; the guide pin being supported for linear movement in a bore 116 in the bracket and the lock actuating rod 115 being movably carried in a bore 117 in the bracket. The lock actuating rod 115 also has an angularly disposed portion 118 and an end portion 119 projecting through the partitioning wall 33 and into the housing portion 34.

The metering device 32, through which the flow of a commodity such as gasoline or oil progresses from the valve 30 to the outlet conduit 27, is one of conventional construction adapted to the continuous measurement of the flow of the desired commodity therethrough. Such metering devices are available and well known for the measurement of the flow of either gases or liquids, as well as other commodities.

At one end the disclosed metering device has a shaft 120 projecting outwardly therefrom upon which a gear 122 is mounted to be driven thereby. A speed change mechanism comprising a gear 123 meshing with the gear 122 and a worm 124, as shown in Figs. 5 and 10, is drivingly connected to and supported for rotation by a common shaft 125. The shaft 125 is rotatably supported by a bearing 126 on the housing of the metering device 32. A gear 127 meshes with the worm 124 and is drivingly connected to a main counter drive shaft 128, which shaft is supported for rotation by a bearing block 129 carried by the housing portion 29 and a bearing 130 carried by the partitioning wall 33. The main drive shaft 128 extends through the partitioning wall 33 and, as depicted in Fig. 16, has drivingly connected to its end opposite the gear 127 a worm 132 from which both quantitative and computing counters may be driven.

Referring again to the dispensing control mechanism before continuing with the description of the counters and recording mechanism, it is my preference that the dispensing control valve shall be released by the use of a keyed instrumentality. In the present instance, I utilize either of the keys 40a or 40b.

Referring to Figs. 1, 7, 9 and 10, a pair of channel-type tracks 133 and 134 are mounted in parallel relationship within the cover 36 of the housing portion 34 and have their opposite ends secured to the base section 35 of that housing portion; the inner ends being supported from a bracket 135 on the partitioning wall 33 and the outer ends being supported from an inwardly extending flange 136 on the upper edge of the base section. The tracks 133 and 134 are disposed at opposite sides of and somewhat above a key slot 137 in the lower edge of the cover 36. As depicted in Fig. 1, the key slot 137 and the track supports are correlated with the line of division between the cover and the base section, so as not to interfere with the opening of the cover.

A key slide 138 is carried for linear movement into and from the housing with the inner end guided by the tracks 133 and 134 and the outer end guided by the sides of the slot 137. At its inner end the slide has integrally formed thereon upwardly extending flanged brackets 139 and 140 which are slidably carried in the opposed channels of the tracks 133 and 134. The main body portion of the key is thus suspended somewhat below the tracks and slides across the flange 136. In the mid-portion, the slide has a key retaining opening 142 of a size to fit the substantially flat mid-portion of the key with the end portions 77 and 78 thereof overlying the surface of the slide at the ends of the opening.

At the inner end of the opening the slide has the notched portion 43 adapted to interfit with the notched end portion of a key. A stop bar 143 (Fig. 10) is secured to the lower portions of the opposed tracks 133 and 134 and extends therebetween adjacent the top surface of the slide. That stop bar 143 has its lower surface notched so as to pass the notched end of a proper key when that key has its notched end properly seated in the notches of the slide. However, if the notches of the key do not fit those of the slide, the key will project upwardly to an extent that the end of the notched portion will engage the stop bar 143 to prevent the further inward movement of the slide. The stop bar 143 also acts as a stop to limit the inward movement of the slide by engagement with the shoulder 75 of the key.

As the key slide 138 approaches the limit of its inward movement with a proper key, such as 40b, carried thereby as shown in Fig. 10, the inner end of that key engages the end of the lock actuating rod 115 to move that rod axially and effect disengagement of the locking pin 109 from the bores 110 and 112 of the bracket 100 and the handle 39. In order to retain the slide in its inner position against the biasing force of the compression spring 113 of the handle locking mechanism, I have provided a spring-urged detent 144 which is carried by the bracket 135 and coacts in the customary manner with a recess in the inner end portion of the key slide, releasably to hold the slide.

A handle 145 is secured to the outer end of the key slide 138 to facilitate the manual movement of the slide between its extended and retracted positions. By preference, the inner surface of the slide handle 145 is disposed at an obtuse angle to the surface of the slide and is notched to fit the surface contour of the key 40a, so that it serves as a support for that key to retain it in a position such that another separate key can be used in the retaining opening of the slide. Adjacent the surface of the slide, the key 40a is hingedly connected to the slide by means such as a hinge pin 146 so that it may be easily folded back against the handle or dropped down into its normal operating position on the slide surface.

In my preferred system of operation, the key 40a has indicia 147 embossed or otherwise placed thereon so that it serves as type. It is proposed, in the present instance, that the word "cash" might be embossed upon the attached key 40a so that when that key is used to effect release of the dispensing mechanism, a cash sale is designated. It is further proposed in this connection, in the present instance, that the key 40b shall have individualized indicia 148 (Fig. 1) thereon designating a customer having a charge account. Thus, when a transaction is made with a customer having a charge account, the hingedly attached key 40a is moved to its out-of-the-way position and the individualized key of that customer is placed in the key slide to effect release of the dispenser locking mechanism. Other transactions are effected by the use of the key 40a and may be termed "cash transactions."

Although many of the parts and features of my dispenser are suited and adapted to use whether printed receipts are made or not, and although receipts could well be printed upon separately inserted sheets, cards or the like, I prefer to provide printed receipts, and for that purpose, to have a paper supply within the machine. I also prefer to utilize a take-up spool or roll which is confined within the locked housing of the dispenser for receiving one copy of the receipt as a check for audit purposes. It is readily understandable that the number of copies of the printed receipt and the manner of printing those copies by carbon or ribbon may be varied, but in the disclosed embodiment of my invention, I have provided for ejecting two copies and retaining the audit copy, with one ribbon copy and two carbon copies. For this purpose, and as shown in Figs. 6, 7, 9 and 10, my preferred receipt paper supply includes one large paper supply roll 149 and a smaller paper supply roll 150. The large paper supply roll has two strips 152 and 153 of carbon-backed paper rolled together upon a cylindrical central spool 154. The smaller paper supply roll has a single strip 155 of plain paper wrapped on a cylindrical spool 156.

Similar supports are provided for removably and rotatably carrying each of the paper supply rolls 149 and 150 within and adjacent one end of the base section 25 of the housing. As shown in Fig. 9, for carrying the supply roll 149, opposite ends of the cylindrical spool 154 are carried by aligned inwardly projecting studs 157 and 158 secured to opposite sides of the base section of the housing. A stud 157 has a locating collar 159 secured thereto at a distance from the inner end and adapted to engage the end of the spool to locate the spool axially within the housing. The other stud 158 has an axially retractable end portion 160 mounted thereon for engagement with the other end of the spool and normally biased toward the spool by a compression spring 162. Thus, removal of each spool is effected by endwise movement against the biasing force of the spring 162 to a small extent necessary for accomplishing disengagement of the spool from the end of the stud 157. Insertion of another spool is accomplished by a readily apparent reverse operation.

After the mounting of the smaller paper supply roll 150, which mounting is, of course, done with the cover 36 open, the strip 155 of plain paper is threaded over paper guide rollers 163 and 164, which guide rollers are carried by shafts having their ends secured to the side walls of the housing. From the guide rollers 164 the strip of paper extends outwardly of the housing through a slot 165 in the end thereof and between outwardly projecting tearing guide strips 166 and 167, which strips extend across opposite sides of the slot. The carboned surfaces of the paper strips 152 and 153 which are rolled together on the paper supply roll 149 face the same way, and those strips are so threaded that they extend across the guide roller 164 with the carboned surface of one strip facing the plain strip 155, so that an impression printed upon the surface of the strip 152 is reproduced on the plain surface of the strip 153 and upon the plain strip 155. The strip of carboned paper 153 which is adjacent the strip of plain paper 155 extends out through the slot 165 with the strip 155, so that two carbon copies of the receipt are ejected from the dispenser.

For retaining an audit copy of the receipt, and as shown in Fig. 7, a take-up spool 168 is mounted inside the cover 36. The strip 152 of carboned paper from the supply roll 149 is threaded around a guide roller 169 near the slotted end of the housing and from that guide roller extends upwardly and back over guide rollers 170 and 172 to the take-up spool 168. For the present it may suffice to say that the take-up spool 168 is driven so as to wind the strip 152 thereon as it is fed from the supply roll 149; said drive being effected through a unidirectional driving mechanism 173 and a friction clutch 174 shown in Figs. 14 and 13, respectively. The unidirectional driving mechanism drives the spool 168 in a direction for winding the paper strip thereon while preventing its unwinding, and the friction clutch 174 prevents tearing of the paper due to variations in the size of the wrapped roll on the spool 168.

In order to obtain a printed impression from uninked type on the plain surface of the paper strip 152, I utilized an inked ribbon 175 carried on a ribbon supply spool 176 in the cover portion of the housing as shown in Figs. 6, 7 and 9. The ribbon supply spool is rotatably mounted, as shown in Fig. 9, in a manner similar to that utilized for mounting the paper supply rolls 149 and 150. That is, the spool is carried by aligned studs 177 and 178, axially located by a collar 179 on the stud 177 and releasably retained by a compression spring 180 on the stud 178 which biases an axially movable end portion 182 of the stud toward the spool.

The ribbon 175 extends from the ribbon supply spool 176 over guide rollers 183 and 184 to a driven ribbon take-up spool 185. Between the guide rollers 183 and 184, the ribbon is desirably closely adjacent, although normally spaced from, the plain surface of the paper strip 152, so that during movement of the paper strip relative to the ribbon, the ink from the ribbon does not rub off upon and smear the surface of the strip 152.

For printing certain fixed and variable record data upon the receipts, I have provided separate indicia bearing printing elements which will be separately described. When indicia bearing keys, such as those described, are utilized, the key serves as one printing element. It may be observed with reference to Figs. 7 and 10 that the indicia bearing surface of the key is adjacent the surface of the ribbon opposite the paper strips 152, 153 and 155.

On one side of the key, in the disclosed embodiment of my invention, a manually adjustable date printing mechanism 186 is provided. This mechanism includes a coaxially disposed set of type cylinders 187, 188, 189 and 190 (Fig. 9) of substantially the same diameter, rotatably mounted on a shaft 192 with the type indicia on the surfaces thereof normally disposed closely adjacent the surface of the ribbon 175. The ends of the shaft 192 are carried by the opposite side walls of the cover 36. The type cylinder 187 carries indicia for the months of the year, the cylinders 188 and 189 carry indicia for the days of the month, and the cylinder 190 carries indicia for designating the year. Cylinder drive gears 193, 194, 195 and 196 are coaxially disposed with respect to the shaft 192 and drivingly connected to the cylinders 187, 188, 189 and 190, respectively. On another shaft 197, shown in Figs. 7 and 10, which shaft extends in substantially parallel relationship to the shaft 192 and has its ends supported by the opposite side walls of the cover 36, a series of idler gears 198, 199, 200 and 202 are mounted for separate and independent rotation and in meshing relationship with the cylinder drive gears 193, 194, 195 and 196, respectively. Worms 203, 204, 205 and 206 are drivingly connected to and carried by shafts 207, 208, 209 and 210, respectively, in meshing relationship with the idler gears 198, 199, 200 and 202, respectively, and the shaft 207, 208, 209 and 210, respectively, are supported for rotation and extend through bearings 212, 213, 214 and 215 in the top wall of the cover. Outside the housing, knobs 216, 217, 218 and 219 are provided for turning the shafts and their respective type cylinders to adjust the date printing mechanism to the proper date.

Due to the relatively conventional nature of recording counters 220 and 222 per se, they have been rather generally indicated without particular regard to minute details of the structure; the detailed disclosure being devoted more particularly to the manner of application and adaptation of those counters to the presently disclosed system and apparatus. Each of the counters 220 and 222 is divided into two sections; one section being for the registration of dispensing units, such as gallons, and the other section being for the designation of a price having a fixed relationship to the number of units dispensed. Both sections of the counter 220 include type carrying cylinders for making printed impressions, while the cylinders of the counter 222 carry indicia visible through a window 223 in the top of the cover 36.

As depicted in Fig. 9, the counter 220 embodies type cylinders 224, 225 and 226 supported for independent rotation near one end of a shaft 227. These cylinders are for the designation of the number of units dispensed. An adjacent stationary type cylinder 228 bears indicia for designating the type of units, such as gallons. At the other end of the shaft 227, the section of adjacent type cylinders 229, 230, 232 and 233 bears indicia for designating the price of the dispensed units. A second stationary type cylinder 234 carries indicia for designating the price units, such as a dollar sign. The shaft 227 which supports the counter 220 has its opposite ends carried by the side walls of the cover and is in a position such that the type on the cylinders is normally adjacent the surface of the ribbon 175 and on the side of the key slide 138 opposite the date printing mechanism 186.

A shaft 235 is disposed in substantially parallel relationship to the shaft 227 and near the top of the cover 36. A series of cylinders 236 is disposed on the shaft 235 in an arrangement similar to that of the type cylinders on the shaft 227. Also, the indicia and arrangement of cylinders in the counters 220 and 222 are similar so that their designations at any one time correspond and the figures indicated visually by the counter 222 will be reproduced on the printed receipt by the counter 220.

Each section of each counter has a separate drive gear. For example, the section of the counter 220, including the type cylinders 224, 225 and 226, is provided with a drive gear 237; while the section including the type cylinders 229, 230, 232 and 233 has a drive gear. In each instance the drive gear for a section of one of the counters is drivingly connected to the cylinder of the counter which bears the digits of the number designated by that section which has the lowest value. That is, if the three cylinders of the unit counting section designate tenths, units and tens, the drive gear is connected to the cylinder which registers tenths. Similarly, if the price section of a counter designates cents, tens of cents, dollars, and tens of dollars, the drive gear is connected to the cent registering cylinder.

As has previously been done in such counters, sprockets such as 239 in Fig. 7 are supported between adjacent cylinders of the set and so constructed that upon each full revolution of one cylinder, the adjacent cylinder is advanced one digit.

Referring to Fig. 9, the drive gear 238 is rotatably mounted upon the shaft 227 and is drivingly connected to the cylinder 229 through a flanged sleeve 240. Thus, the cylinder 229 is directly driven from the gear 238. Each full revolution of the cylinder 229 advances the cylinder 230 by one digit, each full revolution of the cylinder 230 advances the cylinder 232 by one digit, and so on. At the other end of the counter, the drive gear 237 is drivingly connected to the cylinder 226 through an internal spindle shaft 242 and a connecting flange 243; while the adjacent cylinders 224 and 225 are carried for rotation independently of the spindle shaft 242 on a sleeve 244 which surrounds that inner spindle shaft. Each revolution of the cylinder 226 advances the cylinder 225 by one digit and each revolution of the cylinder 225 advances the cylinder 224 by one digit.

As indicated on an exemplary form of receipt 245 which is depicted in Fig. 15, a date 246 is printed from the date printing mechanism 186, the printed data represented at 247 indicates the type of data which may be printed from the key, such as 40b, and the amounts designated at 248 and 249 represent those printed from the sections of the counter 220. In addition to such variable data, it may also be desirable to print upon each receipt some individualized data or advertising matter, such as that indicated at 250. For printing the fixed data, I prefer to use a separate type cylinder 252 which is separated both physically and functionally from the variable type cylinders, as shown in Figs. 8 and 9. The type cylinder 252 is carried by a rotatably supported shaft 253, the opposite ends of which are supported by bearings 254 and 255 secured to opposite side walls of the cover 36. The position of the type cylinder 252 is such that the type is adjacent the surface of the ribbon 175 and extends in rows across the ribbon surface.

As illustrated structurally in Figs. 6, 7, 11 and 12, and diagrammatically in Fig. 16, the visual and printing cylinders of both the quantitative and price recording counters are driven from metering device 32 through the shaft 128 and worm 132. Considering first the quantitative or unit recording counter, it is driven through a shaft 256 having thereon and drivingly connected thereto a gear 257 which meshes with the worm 132 and a worm 258 (Figs. 6 and 16). The shaft 256 is rotatably supported at its opposite ends by bearings 259 and 260 secured to a side wall of the cover 36. On diametrically opposite sides the worm 258 meshes with and drives the printing counter drive gear 237 and an idler gear 262 which is rotatably supported by a shaft 263 extending across the interior of the cover 36. On the side opposite the worm 258, the idler gear 262 meshes with and drives a visual quantitative counter drive gear 264.

With the disclosed arrangement of drive gears and shafts, both the printing and visual quantitative counters are driven in unison and continuously from the metering device. The positions of the counter cylinders of the printing and visual counters are such that the numbers exposed at the window 223 are also in position for printing adjacent the ribbon 175. The idler gear 262 between the worm 258 and the visual counter drive gear 264 serves to effect rotation of the counter cylinders of the visual counter in the same direction as the cylinders of the printing counter.

The shaft 256 also carries and has drivingly connected thereto a bevel gear 265, which bevel gear meshes with and drives a second bevel gear 266 on a shaft 267. On its other end the shaft 267 carries a gear 268 which, through an idler gear 269, drives a main drive gear 270 of a variable computing mechanism 272. As shown in Figs. 6 and 7, the shaft 267 is supported at its opposite ends by the bearing 260 and a bearing 273 secured to the bottom wall of the base section of the housing. The idler gear 269 is rotatably supported by a stud shaft 274 which is rotatably supported in a bearing 276 secured to the bottom wall of the base section of the housing.

Considering the variable computing mechanism as an intermediate driving unit for the present, it is actuated by rotation of the main drive gear 270 by power derived from the metering device through the aforementioned shaft 267 and gears 265, 266, 268 and 269. The variable computing device drives a bevel gear 276 which, in turn, meshes with a bevel gear 277 drivingly connected to a shaft 278 (Figs. 11 and 16). As shown in Figs. 12 and 16, the shaft 278 also has drivingly connected thereto a bevel gear 279 which meshes with another bevel gear 280 on a shaft 282. Coacting bevel gears 283 and 284 on the shaft 282 and a shaft 285, respectively, serve to drive the shaft 285 upon which a worm 286 is mounted.

In a manner similar to that utilized for driving the visual and printing quantitative counters, the worm 286 meshes on diametrically opposite sides with the counter drive gear 238 and an idler gear 287, which idler gear meshes with and drives a counter drive gear 288. Thus, as in the case of the quantitative counters, the printing and visual price counters are driven in unison by the worm 286 so that the visual price counter shows the figures which are in position for printing adjacent the surface of the ribbon 175. With the disclosed driving mechanism, the price counters are actuated by the metering device continuously to indicate a computed price figure equal to the quantitative unit figure multiplied by a fixed factor which is the unit price.

As a consequence of price fluctuations which occur at times, it is considered desirable to include in my dispensing apparatus a computing mechanism which is readily adjustable within a range of prices to establish a certain price factor. Various types of such mechanisms may be utilized in my system and apparatus. I prefer, however, to utilize one which does not require a skilled mechanic to make adjustments or the interchange of separable gears. I also prefer a mechanism in which changes may be made with expedience by one authorized to make such changes, but which is not exposed as a temptation for tampering.

My preferred form of variable computing mechanism 272 is illustrated in Figs. 7, 11 and 16. In this mechanism, a first stud shaft 289 is supported for rotation by a bearing 290 secured to the bottom wall of the base section 35 of the housing. The main drive gear 270 is drivingly connected to that first stud shaft. The shaft 289 also carries and is drivingly connected to a set of driven price change gears 292, 293, 294, 295, 296, 297, 298, 299 and 300. The number of driven price change gears in the set is dependent upon the desired fractional limits in price change which are to be recorded. In the disclosed apparatus, the price change limits are in terms of tenths and there are nine driven price change gears in the set. This provides a gear for each tenth from one to nine, omitting the zero.

The driven price change gears vary in size and are desirably disposed along the shaft 289 in sequential order of size. The sizes of the gears of the series bear a fixed and predetermined relationship to one another. That is, in the present instance, where the limits of variation are in terms of tenths, the gears of the series vary in size in terms of tenths so that the diameters, circumferences or numbers of teeth for each gear are one-tenth more or less than the same dimensions of the adjacent gear.

A second shaft 302 is preferably disposed in aligned relationship to the shaft 289 and suitably supported for independent rotation relative thereto. As indicated in Fig. 7, the shaft 302 is piloted in an end bearing 303 which has a coaxial bearing for the end of the shaft 289. The drive for the second shaft 302 includes a number of planetary transmissions 304a, 304b and 304c equal to the number of variable digits in the unit price. In the present instance there are three such planetary transmissions since it is assumed that the unit price may vary in tenths, units and tens of cents. The structure and operation of each of these planetary transmissions being substantially the same, except for the sizes of certain of the gears, it is considered that an explanation of the relationships of parts for one will suffice for the others.

The main drive gears of each transmission 304a, 304b and 304c successively vary in size and are respectively designated as 314a, 314b and 314c. These main drive gears are rotatably supported relative to the shaft 302. In each of the planetary transmissions, and taking the transmission 304c for example, a sun gear 315c is mounted adjacent the drive gear 314c and is drivingly connected to the shaft. Smaller planetary gears 316c and 317c are disposed in symmetrical relationship about the sun gear 315c and mesh with the sun gear. In each instance the planetary gears are carried relative to the main drive gear and rotatably supported thereon by suitable stud shafts 318c and 319c. With this arrangement of parts, the shaft 302 is driven by rotational movement of the drive gears 314a, 314b and 314c as such force is transmitted through the respective planetary and sun gears.

To effect the driving of each of the planetary transmissions from a selected one of the price change gears, I have provided intermediate drive mechanisms 320a, 320b and 320c, which intermediate drive mechanisms have some variations in the sizes of respective parts, but are otherwise similar in construction and arrangement. That is, each of the intermediate drive mechanisms 320a, 320b and 320c includes a shaft 322a, 322b and 322c, respectively, which is rotatably supported by suitable bearings, such as 324 and 325 (Fig. 7), within the base section 35 of the housing. The shafts 322a, 322b and 322c carry and are drivingly connected to gears 326a, 326b and 326c, which gears, respectively, mesh with the drive gears 314a, 314b and 314c of the planetary transmissions. The disposition of the shafts 322a, 322b and 322c about the axis of the shaft 289 is such that the gears 326a, 326b and 326c engage circumferentially displaced portions of the planetary drive gears 314a, 314b and 314c.

Gears 327a, 327b and 327c are drivingly connected to the shafts 322a, 322b and 322c, respectively, and are slidable axially along those shafts to positions in the planes of the various price change gears 292—300, and are connected to handles 328a, 328b and 328c, respectively, so as to be movable along their respective shafts in response to manual movement of the handles. Gears 329a, 329b and 329c are respectively, rotatably supported by the handles 328a, 328b and 328c in meshing relationship with the gears 327a, 327b and 327c. By swinging movement of the handles about the axes of their respective shafts 322a, 322b and 322c, the gears 329a, 329b and 329c may be brought into and removed from meshing engagement with the various price change gears 292—300. Thus, it may be understood that by swinging and axial movement of the handles 328a, 328b and 328c relative to their respective shafts, each of the planetary transmissions 304a, 304b and 304c may be driven from any selected one of the price change gears 292—300. It is by such selection of the price change gears from which the planetary transmissions are driven that a designated unit price is selected and set in the variable computing mechanism.

The movements of the metering device being in terms of the quantity of a commodity dispensed, the computing mechanism is set to correspond to the desired unit price, and when thus set, effects an integration of the component digits of the unit price multiplied by the number of units dispensed.

In order that the handles 328a, 328b and 328c may be accessible for effecting alteration of the setting of the variable computing mechanism in case of a price change, I have provided slots 330a, 330b and 330c in the outer side wall of the base section of the housing through which those respective handles extend. One edge of each of the slots is notched, as indicated at 332a, 332b and 332c at positions aligned with the price change gears. The respective handles fit into the slots to designate and maintain a selected setting for each. As one manner of preventing tampering with the setting of the price change mechanism, I have indicated in Figs. 1 and 6 a box-like cover 333 having a flanged edge 334 secured to the outer wall of the base section of the housing by fastening means, such as screws 335, which covers the ends of the handles. It may be readily understood that this cover may be locked in place.

In order to effect the accomplishment of a number of functions at the conclusion of each dispensing operation, including the printing and ejecting of a receipt, the re-setting of the recording counters to zero and the movements of the take-up spools and ribbon, it is desirable to have an additional manually operated or controlled mechanism. As an actuating element for such a mechanism, I have provided a manually operable recording slide lever 336 in the form of a flat metal bar shown in Figs. 6, 7, 9, 11, 12, 13 and 17 to 20. This slide lever is carried for linear sliding movement longitudinally of the dispenser housing by slotted tracks 337 and 338 secured to and extending along the inner surfaces of the side walls of the housing base section 35. At one end the slide lever 336 extends out of the housing through a slot 339 and between bars 340 and 342 which make up the track 338. The slide lever and its path of movement, as determined by the tracks 337 and 338, are disposed below the key slide 44 in the base section of the housing and are substantially parallel to the bottom of that base section, so that the slide may be moved longitudinally of the housing without interference with the key slide or its associated mechanism. On the portion of the slide lever which extends from the housing, a handle 343 is provided to form a grip to be utilized in effecting the manual operation of the slide lever.

As shown in Fig. 7, the slide lever 336 has one end of a tension spring 344 connected thereto, the other end of which spring is secured to the end wall of the housing to bias the slide lever to a normal position at one end of the slot. In order to prevent reversal of the movement of the slide lever before a full stroke has been completed in each direction, and as shown in Fig. 12, a toothed rack 345 is mounted within the base section of the dispenser housing at a position below the slide lever and extending in substantially parallel relationship to the slot 339 through which the slide lever moves. A resilient leaf spring 346 is secured to the lower surface of the slide lever and extends to a position such that a flexible projecting end thereof engages the teeth of the rack 345 during the movement of the slide to bend the spring away from the direction of slide movement. Thus, when movement of the slide has been started in one direction, the flexed end portion of the leaf spring 346 prevents the return movement of the slide and after the spring has passed the end of the rack. During the return stroke of the slide, the operation of the spring is similar, but the leaf spring 346 is flexed in the opposite direction.

As shown in Figs. 7 and 11, the slide lever 336 has secured to its upper surface which faces the paper strip 155 a hinge bracket 347. The hinge bracket, in the disclosed form, is composed of a base bracket 348 having opposed side arms pivotally connected to side arm extensions 349 by fastening means such as axially aligned rivets 350, so that the side arm extensions are swingable in planes transverse to the slide lever. At their extending ends, the side arm extensions 349 rotatably support a shaft 352 which carries between those side arm extensions a roller type platen 353. A tension spring 354 having one end connected to the shaft 352 and its other end anchored to a bracket 355 on the slide lever 336 biases the platen 353 and its supporting extension arms to a position such as that illustrated in Fig. 7 in which the platen engages the surface of the lower paper strip 155. A stop, such as a detent 357, establishes the normal extended positions of the side arm extensions. It may be observed by reference to Fig. 7 that the normal position of the slide lever 336 is such that the platen 353 normally engages the paper strip between the date printing mechanism 186 and the type cylinder 252.

Printing of the data recorded on the date printing mechanism 186, the key 40a or 40b carried by the slide 44, and that recorded on both the quantity and price cylinders of the recording counter 220, is accomplished by the initial movement of the slide lever 336 through a full stroke from its normal position so that the platen 353 forces the paper strips and ribbon against the type surfaces of those parts. This printing is done while the paper strips and ribbon, as well as the recording parts are stationary and in fixed relative positions.

As shown in Fig. 11, both ends of the platen shaft 352 extend beyond the side arm extensions 349 to positions near the side walls of the housing base section. As depicted in Figs. 10, 11 and 12, a channel-type cam track 358 is mounted on and supported by one side wall of the housing base section with the channel thereof opening inwardly toward the interior of the housing. An end portion 359 of that cam track is aligned for engagement with the projecting end of the platen shaft 352 to receive that shaft in the channel of the cam track as it approaches the end of the slide lever stroke remote from its normal position. As the end of that stroke is approached, the platen 353 is moved downwardly about the hinge axis of the side arm extensions to a position such as that indicated in dotted lines at 353a in Fig. 12. In the latter position, the platen is retracted away from the paper strips for and during the major portion of the return stroke of the slide lever and when the slide is in any position in which one of the printing parts would be crossed by the platen.

As an aid to retaining the platen in the retracted position, means such as a detent 360 in the bracket 348 may be provided. Also, the cam track 358 has connected linear portions 362 and 363 which remain in engagement with the end of the shaft 352 during the major portion of the return stroke of the slide lever to insure the retracted return movement of the platen.

As shown in Figs. 6 and 11, an endless chain 364 is carried by sprockets 365 and 366 spaced longitudinally of the housing base section and so disposed that between the sprockets the chain is substantially parallel to and adjacent the path of movement of the slide lever. The sprockets 365 and 366 are rotatably supported by stud shafts 367 and 368, respectively, which are supported by bearings 369 and 370 on the side wall of the housing base section. The stud shaft 367 also carries and is drivingly connected to a gear 372. As depicted in Fig. 6, the chain driven gear 372 meshes with a gear 373 which is drivingly connected to one end of the fixed data printing cylinder shaft 253 so that rotation of the gear 372 drives that printing cylinder.

As illustrated in Figs. 7, 11 and 12, a shaft 374 is disposed immediately below and on the opposite side of the paper strips from the printing cylinder shaft 253, which shaft 374 is rotatably supported by brackets 375 and 376, as indicated in Figs. 11 and 12. The mid-portion of the shaft 374 carries a cylindrical platen 377. In my preferred construction, the bearings, such as 378 (Fig. 12), which support the shaft 374 in the brackets 375 and 376 are in the form of elongated slots which permit movement of the platen shaft 374 toward and from the paper strips and the fixed data printing cylinder 372. In the disclosed embodiment of my invention, the cylindrical platen 377 is not driven but is free to rotate.

The brackets 375 and 376 also provide bearings for rotatably supporting a cam shaft 379 adjacent to and in parallel relationship with the platen shaft 374. This cam shaft has thereon a pinion 380 (Fig. 6) which is drivingly connected thereto and which meshes with the chain driven gear 372, to be driven by rotation of that gear. At each end the shaft 379 carries and is drivingly connected to a cam 382, as depicted in Figs. 11 and 12, which cams are aligned and of such proportions and shape that during each revolution of the cam shaft 379, the cams simultaneously engage the ends of the platen shaft 374 to move that shaft in its bearings toward the paper strips and to a position that causes the platen to apply pressure against the type on the printing cylinder 252. The ratios of the gears 373, 372 and 380 are such that the cams 382 are turned at a rate such that they force the platen 377 upwardly to effect a pressure engagement between the ribbon and type for each row or line of type on the printing cylinder. During the intervals between successive lines of type on the printing cylinder 252, the pressure is relieved from the paper strips, so as to permit free movement of the paper and prevent it from becoming buckled or wrinkled.

For driving the chain 364 on its support sprockets 365 and 366 which, in turn, drives the printing cylinder 352 and cams 382 in timed relationship, and in order to drive that chain at the desired time, I have provided a sprocket 383 on the end of the platen shaft 352 (Figs. 6 and 11), which sprocket is moved into driving engagement with the chain 364 when the platen 353 and its supporting arms are swung down by the portion 359 of the cam to the level of the portion 362 thereof. Hence, during the return stroke of the slide lever 336 and while the end of the platen shaft is engaged by the portion 362 of the cam track 358, the sprocket 383 drivingly engages the chain 364 to carry it along with the slide lever. The length of the portion 362 of the cam track 358 is determined so that during the driven movement of the chain 364 the fixed data printing cylinder 252 is turned one revolution. At the end of the portion of the return stroke of the slide lever during which the platen shaft 352 is controlled by the portion 362 of the cam slide, the cam slide is curved away from the chain so as to effect disengagement of the sprocket 383 from the chain 364. The portion 363 of the cam slide holds the platen shaft 352 in a position such that the platen 353 does not engage the paper strip and the sprocket 383 is out of driving contact with the chain 364.

In the preferred embodiment of my invention, I also utilize the intermittent motion of the chain 364 to drive a zeroing mechanism 384 which returns all of the recording cylinders of the counters to their zero positions between dispensing operations and after the data recorded thereon has been printed upon a set of receipts. This zeroing mechanism is illustrated in Figs. 7 and 8. In that mechanism a shaft 385, which is rotatably supported by bearings such as 386 on opposite sides of the housing cover 36, has drivingly mounted thereon a sprocket 387 which drivingly engages the chain 364 and drive gear 388 which meshes with a gear 389 on a shaft 390. The shaft 390 is rotatably supported by bearings such as 392 on opposite sides of the housing cover to be driven by the gear 389.

In axially spaced relationship along the shaft 390 is a series of spaced gears such as 393 and 394 equal to the number of recording cylinders in the recording counters 220 and 222. Each of the gears, such as 393 and 394, is supported from the shaft through an overrunning clutch (not shown) so as to be driven by the shaft 390 in only the direction necessary for returning the recording cylinders to their zero positions. Additionally, each overrunning clutch is driven from the shaft through a friction clutch, such as 395, which friction clutches slip after the recording cylinder driven therethrough has reached its zero position. Also, each of the recording cylinders is stopped when turned to its zero position in one direction by a unidirectionally effective stop, such as those indicated at 396 and 397 in Fig. 7. Each of the gears, such as 393 and 394, meshes with a recording cylinder drive gear, such as 398 and 399, which latter gears each drive one of the recording cylinders through an overrunning clutch (not shown) disposed within the recording cylinder to return that recording cylinder to zero. The overrunning clutches within the recording cylinders permit rotation of the recording cylinders in their direction for counting without interferences from the zeroing mechanism.

As indicated in Fig. 7, the recording cylinders of the recording counter 222 are returned to zero in a similar manner to those of the recording counter 220 by a series of gears, such as 400, meshing with their respective recording cylinder driving gears, such as 402, and rotatably supported by a shaft 403; each of the gears, such as 400, being driven from one of the gears, such as 393, on the shaft 390 through an idler gear, such as 404, rotatably supported by a shaft, such as 405.

It may be recalled that the chain 364 which drives the zeroing mechanism 384 is driven only during the initial portion of the return stroke of the slide lever 336. The ratios of the gears, such as 388 and 389, are, consequently, proportioned so that sufficient movement is acquired for returning each or any of the recording cylinders to their zero position from an extreme position. The gears, such as 400 and 404, preferably rotate the recording cylinders of the counter 222 at the same rate as the recording cylinders of the counter 220 so that both counters are returned to zero in unison, as well as being driven in unison during their counting operation.

For driving the take-up spool 168 so that it will wrap the audit receipt copies thereon as the other copies are ejected from the dispenser, and for effecting sequential movements of the ribbon 175, I have provided a second drive chain 406 which is shown in Figs. 11 and 12. This drive chain is carried near the inner surface of the housing cover wall opposite the first drive chain 364 by sprockets 407 and 408. The sprockets 407 and 408 are each supported by a stud shaft, such as 409 (Fig. 11), which, which, in turn, is rotatably carried by a bearing, such as 410, secured to the side wall of the cover. Like the chain 364, the chain 406 is supported in substantially parallel relationship to the path of movement of the slide lever 336. However, rather than being intermittently driven in the manner of the chain 364, the second chain 406 is drivingly connected to the slide lever 336 by a suitable means, such as a bracket 412, and is driven in both directions each time the slide lever is actuated through a cycle of its movement.

As depicted in Figs. 7, 13, and 14, a stud shaft 413 rotatably supported on the interior surface of the cover side wall near the take-up spool 168 has drivingly connected thereto a sprocket 414 in driving engagement with the chain 406 and a drive gear 415 which meshes with a driven gear 416. The gear 416 and a gear 417 are drivingly connected to opposite ends of an idler shaft 418 rotatably carried by a bracket 419.

The take-up spool 168 is supported by a shaft 420. In order to provide a unidirectional drive for the take-up spool 168 so that paper will not be unwound from the spool during the movement of the slide lever from its normal position, but so that the take-up spool will be driven to wind paper thereon during the return stroke of the slide lever, a ring gear 422 is carried relative to the shaft 420 by an overrunning clutch 423 (Fig. 14). The ring gear 422 meshes with the idler gear 417 which is driven from the sprocket 414 and chain 406 to drive the shaft 420 in the proper direction for winding paper on the spool during the return stroke of the slide lever. The overrunning clutch 423 is desirably supported for rotation relative to the shaft 420. Then, in order to prevent tearing of the paper strip as the roll on the spool becomes larger, the spool is driven through and from the overrunning clutch 423 through a friction clutch 424, which friction clutch slips if there is a tendency for the take-up spool to roll up paper faster than it is being unrolled from the supply rolls.

On one side of the ring gear 422, I have provided an axially projecting pin 425, which, at each revolution of the ring gear, engages a tooth of an intermediate sprocket 426. The sprocket 426 is drivingly connected to a rotatably supported shaft 427, which, in turn, is drivingly connected to a gear 428, which latter gear meshes with a gear 429 carried by a shaft 430 and drivingly connected to the ribbon take-up spool 185. Thus, at intervals, and each time the ring gear 422 is turned through one revolution, the ribbon take-up spool 185 is moved a distance dependent upon a space between the teeth of the intermediate sprocket 426 to move the ribbon along and provide freshly inked portions for printing.

Each time the slide lever 336 is moved from its normal position, the paper strips and ribbon remain stationary and the recording counters remain unchanged until after the platen 353 has moved across the variable data printing parts. However, in order to eject the printed receipt from the dispenser, I move the paper strips with the slide lever on its return stroke so as to eject a full copy of the receipt which has been printed and supply fresh paper for the printing of a subsequent receipt. For gripping the paper to provide such movement at the proper time, I have provided a paper gripping mechanism 432 which is carried by the slide lever and shown in Figs. 19 and 20.

This paper gripping mechanism includes a bracket 433 secured to the slide lever and having a flanged end portion 434 which moves along the marginal portions of the paper strips and the ribbon 175 when the slide lever is moved. Supported for linear movement toward and from the flanged end portion 434 of the bracket by means such as headed pins 435 riding in slots 436 in the bracket, is a movable gripping plate 437 normally disposed in substantially parallel relationship to the flanged end portion 434. The gripping plate 437 normally moves along the marginal surface of the paper strips adjacent the face thereof opposite the flanged end portion 434.

An eccentric cam 438 is rotatably carried adjacent the lower face of the gripping plate 437 by a shaft 439 to which it is secured. The shaft 439 is rotatably supported by the bracket 433 and has an angularly disposed end portion 440 disposed in predetermined relationship with respect to the position of the eccentric cam 438. The position of the angularly disposed end portion relative to the cam position is such that during the initial stroke of the slide lever, the gripping plate 437 is separated from the flanged end portion 434 so that the paper strips slide freely therethrough. At the end of the initial stroke of the slide lever, the end portion 440 of the shaft engages a pin 442 secured to and projecting inwardly from the side wall of the housing, as shown in Fig. 9, to rotate the cam to a position such that it moves the gripping plate toward the flanged end portion 434 and thereby holds it with the paper strips firmly gripped between that gripping plate and the flanged end portion 434. It remains in the gripping position during the return stroke and until the end portion 440 of the shaft engages a pin 443 at the other end of the stroke to return the gripping plate to the normal position shown in Figs. 19 and 20.

With the arrangement of parts as herein disclosed, it is to be noted that the line of division or hinge line between the cover 36 and base section 35 of the housing is substantially coincident with the slot 165 and printing plane of the paper strips. With this arrangement of parts, access is readily attainable for replacing either the paper rolls or the ribbon, and division is made in such a way that some of the parts move with the cover, while others remain in the base section. As shown in Fig. 6, a slot 443 in the cover opens toward the edge of the cover adjacent the main counter drive shaft 128 to permit the opening movement of the cover with respect to that shaft. When the cover is opened, the gear 257 is separated from the worm 132, the bevel gears 265 and 266 are separated and the printing cylinder drive gear 373 is separated from the gear 372 which is driven by the chain 364. Those gears, of course, return to their meshed positions when the cover is closed.

In addition to the provision of the rack 345 and spring 346 for preventing the slide lever 336 from being reversed at some intermediate position of its stroke in either direction, I also prefer to include in my dispenser an interlock between the dispenser control handle 39 and the slide lever 336 which prevents the dispensing of a commodity during the operation of the slide lever and also prevents the operation of the slide lever during a dispensing operation. This interlock prevents the defacing of receipts or damage to the printing mechanism by operation of the counters during the time in which a receipt is being printed and also tends to insure the provision of an accurate receipt for each quantity of the commodity dispensed.

In the disclosed embodiment of my invention, and as shown in Figs. 5, 10, 17 and 18, the aforementioned interlock includes a control rod 444 having bent sections 445 and 446 connected by a turnbuckle 447; the turnbuckle being desirable for purposes of adjustment in one direction. At one end, adjacent the control handle 39, a second turnbuckle 448 is provided for effecting adjustment of the rod position in a direction transverse to that of the turnbuckle 447. At the control handle and, as shown in Fig. 5, the control rod 444 has a cross pin or bent end portion 449 which rides in a cam slot 450 in the handle 39 so as to be movable along that cam slot. The angular disposition of the cam slot 450 is such that when the control handle is moved to effect opening or closing of the valve 39, a remote end portion 452 of the control rod is moved axially of that portion without materially changing its position in a direction transverse to the axial movement.

As shown in Figs. 17 and 18, the end portion 452 of the control rod 444 is bent to extend through a slot 453 in the partitioning wall 33 and also has a second bend providing an end 454 reversely disposed with respect to the portion 452 and terminating at a position aligned with the path of movement of the slide lever 336. As depicted in Fig. 5, the control rod 444 is biased axially and laterally by a tension spring 455 to a position such that when the slide lever 336 is in its normal position, the end 454 of the control rod abuts the lower face of the slide lever, as shown in Fig. 17. The slot 453, at the end thereof toward which the control rod is biased, has an angularly disposed portion 456 extending laterally from the side of the slot toward which the spring 455 biases the rod. Thus, when the slide lever 336 is moved from its normal position, the end portion of the control rod moves upwardly in the slot 453 and laterally into the portion 456 of the slot as a result of the biasing force of the spring 455 thereby to reach a position in which it is locked against axial movement. With the slide end of the control rod locked against axial movement, the control handle 39 cannot be moved downwardly for opening the valve 30.

When the slide lever 336 is returned to its normal position, an angularly disposed edge surface 457 on one side thereof exerts sufficient force laterally against the rod to move it out of the portion 456 of the slot and cams the control rod downwardly to its normal position in engagement with the lower surface of the slide lever.

Also, as shown in Figs. 17 and 18, the control rod 444 has secured to one side thereof a bent rod 458 having an end portion 459 in substantial alignment with and spaced from the end 454. The bent rod 458 extends through a slot 460 in the partitioning wall, which slot has an angularly disposed portion 462 complementary to that of the slot 453. A recess 463 in the slide lever 336, when the slide lever is in its normal position, is aligned with the end portion 459, so that axial movement of the end portion 452 of the control rod resulting from movement of the control handle 39 for opening of the valve 30 engages the end portion 459 of the control rod in the recess 463 of the slide lever. This locks the slide lever in its normal position while the control valve is held open.

The operation of the parts of my recording dispenser will now be reviewed to provide a summarized resume of the structure and its correlated functions, as utilized in the disclosed system. Supply rolls of paper and ribbon are placed in the dispenser when the cover is opened and threaded to the ejecting slot and take-up slots, as shown in Fig. 7. The cover is then closed. After closing the cover, the date printing mechanism 186 may be set to the proper date by manual adjustment of the knobs 216, 217, 218 and 219 exposed on the exterior of the housing. In the preliminary setting of the machine, the variable computing mechanism 272 is set to a predetermined unit price by adjustment of the handles 328a, 328b and 328c to selected positions in the notches 332a, 332b and 332c, respectively, so that predetermined ones of the intermediate drive gears 329a, 329b and 329c are in meshing engagement with certain of the price change gears 292—300.

After the foregoing preliminary steps, the recording dispenser is in readiness for use. When used, the outlet, which, in the present instance, is the nozzle 46, is inserted into a suitable receptacle. After such placement of the nozzle, one of the two types of keys, 40a or 40b, is selected to suit the type of transaction; said key being inserted in the extended slide 44 with its keyed portion matching with that of the slide. With the key in place, inward movement of the slide to its full extent actuates the push rod 115 to withdraw the locking pin from the control handle 39. This releases the control handle so that it may be moved to open the valve 30.

The movement of the control handle 39 to open the valve 30 not only actuates that valve to effect flow through the metering device 32 and the outlet nozzle, but actuates the control rod 444 to lock the slide lever 336 in its normal position.

Flow through the metering device 32 operates that device to drive the quantitative recording counter and also actuates the price recording counter through the medium of the computing mechanism 272. The quantitative and price recording counters include both visual and type cylinders driven in unison to render a visual indication corresponding to that in position for printing at any time.

The conclusion of a dispensing operation may thus be determined either by a limiting price or a limit of quantity. When the desired limit is reached the dispensing control valve is closed by releasing the control handle 39. The movement of that handle changes the position of the control rod 444 to effect release of the slide lever.

For accomplishing the printing and ejecting of a receipt giving the pertinent data relative to the transaction, the slide lever 336 is actuated against the biasing force of the spring 344 by manual force applied to the handle 343. After such manual movement of the slide lever has been started, it cannot be reversed until it has been moved through a full stroke due to the action of the leaf spring 346 which engages and is flexed by the toothed surface of the rack 345. Movement of the slide lever from its normal position releases the control rod 444 for actuation by the spring 455 so that the end portions thereof move into the transversely disposed end portions 456 and 462 of the slots 453 and 460, respectively; thus, locking the control handle 39 so that it cannot be moved to open the valve while the slide lever is away from its normal position.

The slide lever carries the platen 353 along the paper strip and across the surfaces of the date printing cylinders, typed key surface and the printing cylinders of the quantitative and price counters. This imprints the data from those cylinders and the key upon the paper strips. At the end of the initial stroke, the paper gripping mechanism is caused to grip the margin of the juxtaposed paper strips by engagement of the angularly disposed end portion 440 of the shaft 439 with the inwardly projecting pin 442 on the interior of the housing. After being thus gripped, the paper strips are carried along with the slide on its return movement. Two of the strips are ejected through the slot 195, and one remains within the dispenser and is rolled upon the take-up spool 168. While the paper is moving, the fixed data printing cylinder 252 is actuated to print that data upon the receipt; the printing pressure of that fixed data cylinder being exerted only in synchronism with the rows of type on the cylinder and being relieved between such rows for periodically releasing the moving paper strip. At the end of the return stroke of the slide lever it cams the control rod 444 back to its normal position so that the control handle 39 can again be actuated and the paper gripping mechanism is released by engagement of the angularly disposed end portion 440 of the shaft 439 with a fixed stop in the form of the pin 443. The platen 353 is returned to its normal position by the action of the biasing spring 354.

Movement of the slide lever 336 produces movement of the drive chain 406 in both directions therewith and effects limited movement of the drive chain 364 in one direction while the platen shaft 352 is engaged by the portion 362 of the cam track. The drive chain 406 turns the paper take-up spool 168 which, in turn, effects an intermittent step-by-step movement of the ribbon take-up spool 185. The drive chain 364 turns the fixed data type cylinder 252 through one revolution and, at the same time, drives the cams 382 which force the fixed data printing platen 377 into contact with the paper in synchronism with the positioning of the rows of type on the cylinder 252. The chain 364 also drives the zeroing mechanism 384 to return all of the recording counter cylinders to their zero positions.

After the described sequence of dispensing and ticket printing and ejecting operations, it may readily be understood that the operating parts of the dispenser are returned to their normal positions for another such dispensing operation. The printed receipt may then be torn off against one of the tearing guide strips. If a separate key, such as 40b, is used during a dispensing operation, it may be removed from the slide at the end of the dispensing operation and after withdrawal of the slide for return to the customer or replacement in the key compartment of closure apparatus, such as shown in Fig. 1.

The withdrawal of the key releases the locking pin 109, whereupon the spring 113 returns that locking pin to its control handle locking position in the aligned bores 110 and 112.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a system for dispensing measured quantities of a commodity from a supply source to a place of use, the combination comprising a dispenser having a communicating connection to the supply source and including flow control means for starting and stopping the passage of the commodity from the supply source through the dispenser, a metering device for measuring the quantity of the commodity passing through the dispenser, a lock normally preventing the flow control means from operating to start the passage of the commodity through the dispenser, indicating means connected to the metering device for indicating the quantity of the commodity which has passed through the dispenser, and a keyed outlet connecting element in communication with the metering device; apparatus through which the measured quantity of the commodity passes at the place of use and which includes a receptacle keyed to fit said outlet connecting element of the dispenser, normally closed key-retaining means, means actuated by placement of the keyed outlet connecting element in said receptacle for effecting release of the key-retaining means, and means for locking said connecting element in the receptacle while the key-retaining means is released; and a key normally held by said key-retaining means and insertable into said lock for effecting release of said flow control means.

2. In a system for dispensing measured quantities of a commodity from a supply source to a place of use as defined in claim 1, the combination being further characterized by the inclusion in said dispenser of a recording and receipt printing mechanism, and manually operable means for actuating said receipt printing mechanism after each dispensing operation of the dispenser.

3. In a system for dispensing measured quantities of a commodity from a supply source to a place of use as defined in claim 1, said key having individualized printing indicia thereon, and said dispenser including a recording and receipt printing mechanism, said recording mechanism being actuated by said metering device for registering and printing figures dependent upon the dispensed quantity of the commodity, and said printing mechanism including means for holding said key so that said printing indicia is imprinted along with said printing figures.

4. In a system for dispensing measured quantities of a commodity from a supply source to a place of use, as defined in claim 1, and wherein said dispenser includes paper supply and take-up means providing a plurality of strips of paper in superimposed relationship with a carbon layer therebetween and one of which strips is fed into the take-up means within the dispenser, a recording and receipt printing mechanism responsive to the metering device for registering dispensed quantities of the commodity, and means for actuating said printing mechanism to imprint the registered quantity upon said strips of paper.

5. In a system for dispensing measured quantities of a commodity from a supply source to a place of use, the combination comprising a recording dispenser having a communicating connection to the supply source and including flow control means for starting and stopping the passage of the commodity from the supply source through the dispenser, a lock normally preventing the flow control means from operating to start the passage of the commodity through the dispenser, and a keyed outlet connecting element in communication with the flow control means; apparatus through which the measured quantity of the commodity passes at the place of use and which includes a receptacle keyed to fit said outlet connecting element of the dispenser, normally closed key-retaining means, means actuated by placement of the keyed outlet connecting element in said receptacle for effecting release of the key-retaining means, and means for locking said connecting element in the receptacle while the key-retaining means is released; and a key normally held by said key-retaining means and insertable into said lock for effecting release of said flow control means.

6. In a system for dispensing measured quantities of a commodity through receiving tank closure apparatus including a keyed flow receiving port, normally locked key retaining means releasable by the insertion of a keyed nozzle into said keyed port, and means for locking the nozzle in said port when the key retaining means is released, the combination comprising a supply conduit, a metering device and a manually operable flow control valve connected to said supply conduit so that the metering device measures the flow through the conduit and the valve controls said flow, a nozzle connected for receiving flow from said metering device and having an outlet end keyed to fit said keyed port of the closure apparatus, a lock for said valve normally preventing opening of the valve, and a key normally retained by said key retaining means for effecting release of said lock.

7. In a system for dispensing measured quantities of a commodity, the combination comprising a supply conduit, a metering device connected to the supply conduit through a manually operable flow control valve, a nozzle connected for receiving fluid from said metering device and having a keyed outlet end, a lock for said manually operable flow control valve normally preventing opening of the valve, a key for effecting release of said lock, tank closure apparatus including a flow receiving port keyed to fit said keyed end of the nozzle, a key retaining housing having an opening therein, and normally closed closure means for said opening for retaining said key within the key retaining housing, said closure means being releasable by insertion of said keyed end of the nozzle in said port to provide access to the key for use in said lock.

8. In a system for dispensing measured quantities of a commodity, the combination comprising a dispenser including a metering device, a keyed outlet connecting element, and a normally locked dispensing control provided with a key actuated release mechanism, a key for effecting release of said release mechanism, and receiving means for the dispensed commodity, said receiving means comprehending a key retaining mechanism for normally holding said key, a connector adapted to fit said keyed connecting element of the dispenser and having means therein for coacting with said connecting element to effect release of the key, and a locking mechanism dependent upon the presence of said key in said retaining mechanism for locking the connecting element to said connector while the key is released for use in the dispenser.

9. In dispensing apparatus, the combination comprising a manually operable mechanism including a movable grip element for controlling the operation of the dispensing apparatus, a locking plunger normally biased into locking engagement with said movable grip element to prevent actuation of said mechanism, a key carrying slide having a notched key carrying portion supported for movement toward and from said locking plunger, a key notched to fit said notched key carrying portion and having a portion adapted to project from the slide when carried thereby, said portion of the key being aligned with said locking plunger so that movement of the slide and key in one direction effects movement of the locking plunger to release said grip element.

10. In dispensing apparatus, the combination comprising a locking mechanism normally preventing dispensing operation of the apparatus and including a key carrying slide having a key receiving opening in the mid-portion thereof and a notched portion at one margin of said opening, a key having a portion shaped to fit into said opening and a portion adapted to overlie said notched portion of the slide, the last mentioned portion of the key being notched, means for supporting the key carrying slide for linear movement, and stop means at a position to engage said portion of the key and prevent movement of the slide unless said notched portions of the key and slide register.

11. In a dispensing system and apparatus, the combination comprising a polygonal printing element presenting type-like indicia disposed at circumferentially spaced positions, means for rotatably supporting said printing element, paper supply and guide means providing a strip of paper adjacent the periphery of said printing element, a slide lever supported for linear movement in a direction substantially parallel to said strip of paper, a roller-type platen disposed on the opposite side of said strip of paper from the printing element, means for supporting said platen for rotary movement and for reciprocatory movement toward and from the printing element, a cam for effecting movement of the platen toward and from the printing element to grip the paper between the platen and each indictum on the printing element and to relieve the gripping force upon the paper between indicia, paper gripping means on the slide for moving the strip of paper in one direction with the slide lever, and means for driving said printing element and cam in timed relationship during movement of the slide lever in one direction.

12. In a dispensing system and apparatus, the combination comprising a metering device, a calibrated counter driven by the metering device and having rotary counting elements presenting typelike indicia at predetermined positions, a rotary printing element having peripherally spaced type-like indicia thereon, said rotary printing element being spaced from said counting elements, paper supply and guide means providing a strip of paper extending across and in adjacent relationship to the type-like indicia on the counting elements and printing element, a slide lever supported for linear movement in a direction substantially parallel to said strip of paper, a platen carried by the slide lever for producing an impression of the indicia of the counting elements upon the paper during movement of the slide lever in one direction, a second platen rotatably supported adjacent the paper and on the side thereof opposite the printing element, means supporting the second platen for reciprocating movement toward and from the printing element to effect impressions of the indicia of the printing element upon the paper, a cam for effecting reciprocating movement of the second platen, means for driving the printing element and cam in timed relationship and means for gripping and moving the paper during movement of the slide lever in the opposite direction.

13. In dispensing apparatus, a price computing mechanism for registering prices to a predetermined number of digits and having readily adjustable parts for preselecting each digit of the unit price of a dispensed commodity, the combination comprising a drive gear and a set of nine driven gears drivingly connected to a shaft, said set of nine driven gears being of successive sizes and having a fixed difference of size between the gears of the succession, a second shaft, a number of planetary transmissions equal to the number of said digits, each of said transmissions having a similar part drivingly connected to the second shaft, and a variable intermediate drive for each of the planetary transmissions and including a transmission drive gear and a movable gear drivingly connected to the transmission drive gear and adapted to mesh with a selected one of the nine driven gears.

WILLIAM A. CREWS.

REFERENCES CITED

The following references are of record in the file of this patent:

UNITED STATES PATENTS

| Number | Name | Date |
|---|---|---|
| 1,206,507 | Bradley | Nov. 28, 1916 |
| 1,427,115 | Milligan | Aug. 29, 1922 |
| 2,250,326 | Carroll | July 22, 1941 |
| 2,293,333 | Eickmeyer et al. | Aug. 18, 1942 |